United States Patent
Pretorius et al.

(10) Patent No.: US 9,684,182 B2
(45) Date of Patent: Jun. 20, 2017

(54) OPTICAL IMAGE OFFSET DEVICE, OPTICAL IMAGE STABILIZATION DEVICE AND OPTICAL OBSERVATION APPARATUS

(71) Applicant: Carl Zeiss AG, Oberkochen (DE)

(72) Inventors: Marco Pretorius, Oberkochen (DE); David Shafer, Fairfield, CT (US)

(73) Assignee: CARL-ZEISS MICROSCOPY GMBH, Jena (DE)

( * ) Notice: Subject to any disclaimer, the term of this patent is extended or adjusted under 35 U.S.C. 154(b) by 1047 days.

(21) Appl. No.: 13/632,196

(22) Filed: Oct. 1, 2012

(65) Prior Publication Data

US 2013/0083396 A1 Apr. 4, 2013

Related U.S. Application Data

(60) Provisional application No. 61/541,476, filed on Sep. 30, 2011.

(30) Foreign Application Priority Data

Sep. 30, 2011 (DE) .......................... 10 2011 054 087

(51) Int. Cl.
*G02B 27/64* (2006.01)
*G02B 5/04* (2006.01)

(52) U.S. Cl.
CPC .............. *G02B 27/646* (2013.01); *G02B 5/04* (2013.01)

(58) Field of Classification Search
CPC ....... G02B 27/64–27/646; G02B 13/10; G02B 13/18; G02B 26/08–26/0891
USPC ................ 359/554–557, 366, 401, 433, 434, 359/668–671, 677–678, 708, 719, 359/793–795, 201.1, 796
See application file for complete search history.

(56) References Cited

U.S. PATENT DOCUMENTS

| | | | |
|---|---|---|---|
| 2,769,367 A * | 11/1956 | Schwesinger | G02B 26/108 352/116 |
| 3,305,294 A | 2/1967 | Alvarez | |
| 3,475,074 A | 10/1969 | Humphrey | |
| 3,884,548 A * | 5/1975 | Linder | G02B 27/646 359/554 |
| 3,942,862 A | 3/1976 | Furukawa et al. | |

(Continued)

FOREIGN PATENT DOCUMENTS

| DE | 32 17 776 | 11/1983 |
|---|---|---|
| DE | 279 326 | 5/1990 |

(Continued)

OTHER PUBLICATIONS

German Office Action of Jul. 30, 2012.

*Primary Examiner* — Bumsuk Won
*Assistant Examiner* — Jeffrey Madonna
(74) *Attorney, Agent, or Firm* — Nixon Peabody LLP; Jeffrey L. Costellia

(57) ABSTRACT

An optical image offset device for compensating for or producing a lateral offset of an image of an observation object (41) in an optical observation device (33) is provided. The optical image offset device comprises at least two optical wedges (1, 3) which are arranged successively along an optical axis (OA) and which are respectively composed of at least two optical elements (5, 7, 9, 11). Each optical wedge (1, 3) has an adjustable wedge angle ($\alpha$, $\beta$) Furthermore the optical wedges (1, 3) have different refractive indices and different dispersions.

20 Claims, 16 Drawing Sheets

(56) References Cited

U.S. PATENT DOCUMENTS

| | | | |
|---|---|---|---|
| 4,436,260 A * | 3/1984 | Donelan | F41G 7/2213 |
| | | | 244/3.16 |
| 4,518,231 A * | 5/1985 | Muchel | G02B 21/22 |
| | | | 359/377 |
| 4,881,800 A | 11/1989 | Fuchs et al. | |
| 5,140,462 A | 8/1992 | Kitagishi | |
| 5,270,857 A | 12/1993 | Oizumi et al. | |
| 5,280,387 A | 1/1994 | Maruyama | |
| 5,325,459 A | 6/1994 | Schmidt | |
| 5,477,297 A | 12/1995 | Suzuki | |
| 5,486,948 A | 1/1996 | Imai et al. | |
| 5,623,364 A * | 4/1997 | Morooka | G02B 27/646 |
| | | | 359/554 |
| 5,642,223 A * | 6/1997 | Hasushita | G02B 13/00 |
| | | | 359/554 |
| 5,909,321 A * | 6/1999 | Kuno | G02B 26/0875 |
| | | | 348/E5.046 |
| 6,014,270 A * | 1/2000 | Bergmann | G02B 13/0095 |
| | | | 359/710 |
| 6,320,705 B1 * | 11/2001 | Dube' | G02B 7/021 |
| | | | 359/665 |
| 6,653,611 B2 | 11/2003 | Eckelkamp-Baker et al. | |
| 6,807,022 B1 * | 10/2004 | Yanowitz | G02B 26/0875 |
| | | | 359/819 |
| 6,850,372 B1 * | 2/2005 | Stenton | G02B 15/00 |
| | | | 359/432 |
| 2004/0036934 A1 * | 2/2004 | Dube | G02B 26/101 |
| | | | 359/196.1 |
| 2005/0152049 A1 * | 7/2005 | Juhala | G02B 26/0883 |
| | | | 359/819 |
| 2009/0002066 A1 | 1/2009 | Lee et al. | |
| 2011/0013244 A1 | 1/2011 | Futterer | |

FOREIGN PATENT DOCUMENTS

| | | |
|---|---|---|
| DE | 692 04 984 | 2/1996 |
| DE | 10 2006 004 623 | 8/2007 |
| DE | 10 2008 000 438 | 9/2009 |
| GB | 518 374 | 2/1940 |

* cited by examiner

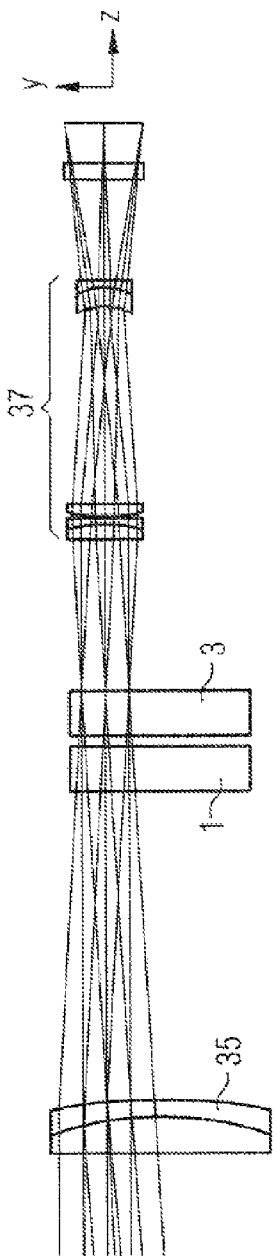
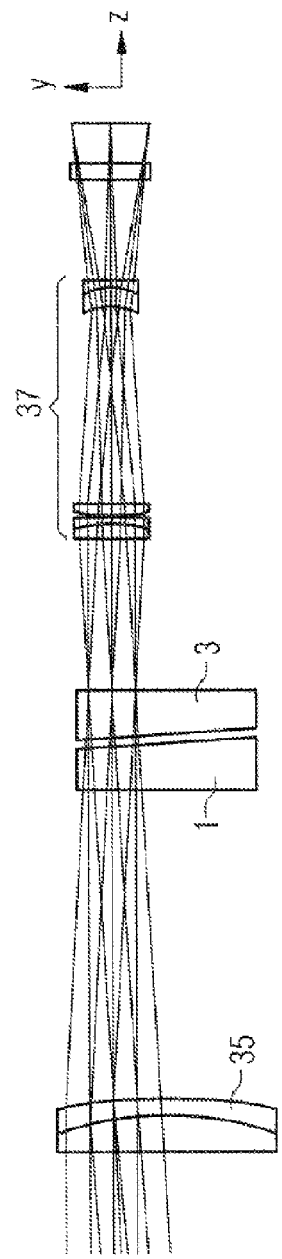
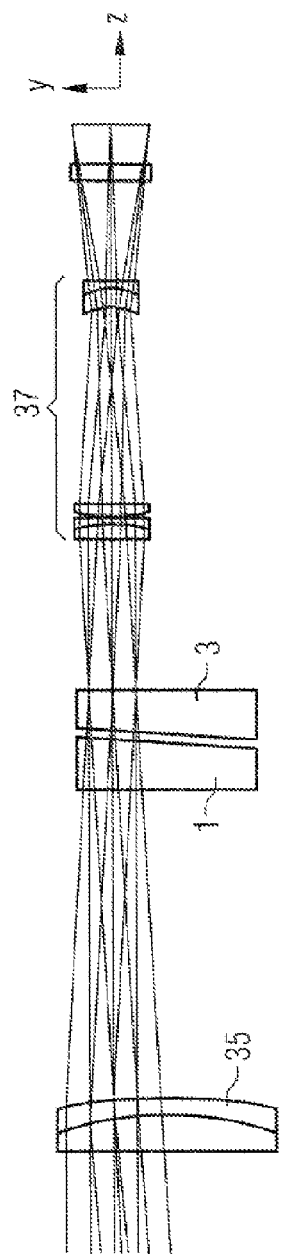
FIG 3
FIG 4
FIG 5

OPTICAL IMAGE OFFSET DEVICE, OPTICAL IMAGE STABILIZATION DEVICE AND OPTICAL OBSERVATION APPARATUS

CROSS REFERENCE TO RELATED APPLICATIONS

This application claims priority under 35 USC 119 to German Patent Appl. No. 10 2011 054 087.3 filed on Sep. 30, 2011 and U.S. Provisional Patent Appl. No. 61/541,476 filed Sep. 30, 2011, the entire disclosures of which are incorporated herein by reference.

BACKGROUND OF THE INVENTION

1. Field of the Invention

The present invention relates to an optical image offset device for compensating for or producing a lateral offset of an image of an observation object with respect to an optical axis in an optical observation device, that is to say for compensating for an offset perpendicular to the optical axis of the optical observation apparatus. The invention furthermore relates to an optical image stabilization device and to an optical observation apparatus.

2. Description of the Related Art

During the observation of observation objects by means of optical observation apparatuses, the observation object must be kept stationary in order to avoid blurring in the images. This applies in particular when electronic imaging is intended to be carried out with the optical observation apparatus. Movements of the observation optics which take place more rapidly than the imaging lead to blurring in the recorded image, which depending on the situation may be highly problematic.

Unintended movements of the observation optics may for example result from hand trembling in the case of hand-held observation and/or recording apparatuses, for which reason a stand is generally used for prolonged exposure times. Nevertheless, vibrations in mechanical holding devices of an optical observation apparatus can also lead to blurring in the image. In various types of operation, for example, operation microscopes are used which are suspended from a stand.

As a mechanical structure, however, the stand is not infinitely rigid and therefore exhibits a certain degree of deformation under loading. Making the stand infinitely rigid is not technically possible. Furthermore, a high rigidity also entails a very high intrinsic weight. The finite rigidity, however, makes the stand a vibratable system. In other words, the stand may be excited in vibrations owing to impacts or a small periodic external force. If the stand vibrates, then the image quality of the operation microscope is significantly influenced, which entails disadvantages particularly in operations. It has therefore been proposed to equip stands for operation microscopes with vibration damping systems. These typically comprise elements which can exert a force on an element of the stand, so as to counteract stand vibrations. An example of such a stand is described in US 2009/002066 A1.

Furthermore, optical image stabilization systems are known in which lateral movements or tilts of the observation optics relative to an observation object to be observed or recorded are compensated for by displacing a lens or lens group in a direction perpendicular to the optical axis. Optical observation apparatuses having such image stabilization systems are described, for example in U.S. Pat. Nos. 5,270,857 and 5,477,297. Lateral displacement of lenses or lens groups, however, i.e. displacement perpendicular to the optical axis, leads to a reduction in the image quality since all types of non-axisymmetric imaging errors (monochromatic and polychromatic) occur in the optics. The reduction of the image quality therefore needs to be compensated for by additional lenses. In comparison with non-stabilized optics, therefore, stabilized optics have four to five additional lenses but still do not achieve the imaging quality of non-stabilized optics. Furthermore, the lateral adjustment range of the displaceable lenses is relatively small, so that the possibilities of compensating for a lateral image offset are generally restricted to compensating for a small lateral image offset. Systems comprising displaceable lenses are therefore more suitable for compensating for vibrations with small amplitudes.

From U.S. Pat. Nos. 4,881,800 and 6,653,611, image stabilization systems are known which comprise mirrors mounted in such a way that they can be moved about one or two axes, with corresponding drive actuators, by which image displacements perpendicular to the optical axis and tilts can be compensated for.

Besides this, there are image stabilization systems which optically compensate for movements perpendicular to the optical axis by variable prisms or variable wedge-shaped elements, instead of by displaceable lenses. Examples of such systems are known from U.S. Pat. Nos. 5,140,462, 5,280,387, 3,475,074 and 3,942,862.

In U.S. Pat. No. 3,942,862, for example, a variably adjustable optical wedge is described which is formed by two lenses, each having a plane face and a spherical face, the spherical faces of one lens being formed convexly and the spherical face of the other lens being formed concavely. One of the two lenses is mounted in such a way that it can be mechanically rotated about a point lying at the center of curvature of the spherical face. Such an optical wedge, however, has a strongly wavelength-dependent deviating effect, so that it even generates a transverse chromatic error on the optical axis of the optical system. The transverse chromatic error, also referred to as chromatic difference of magnification, leads to color fringing, i.e. colored lines along the edges of an object, since the observation object is magnified with different strengths in different wavelength ranges.

From U.S. Pat. No. 5,280,387, a system is known comprising two identical prisms which consist of the same types of glass and are arranged successively along the optical axis, the prisms being rotatable about the optical axis. An image offset which results from tilting of the optics relative to the observation object can be compensated for by rotating the two prisms about the optical axis. Each of the two identical prisms is composed of two elements consisting of different glass material, the two prisms being oriented relative to one another in such a way that elements consisting of the same glass material lie next to one another. In this way, chromatic aberrations can be kept small.

In relation to the prior art, it is an object of the present invention to provide an advantageous optical image offset device for compensating for or producing a lateral image offset in an optical observation device. It is another object of the present invention to provide an advantageous optical image stabilization device. It is yet another object to provide an advantageous optical observation apparatus. In this context, a lateral image offset is intended to refer to an image offset which is attributable either to an offset of the optical observation apparatus, or its observation optics, perpendicular to the optical axis or to a tilt of the optical observation apparatus, or its observation optics.

The first object is achieved by an optical image offset device according to claim 1, the second object is achieved by an optical image stabilization device according to claim 13, and the third object is achieved by an optical observation apparatus according to claim 16. The dependent claims contain advantageous configurations of the invention.

SUMMARY OF THE INVENTION

According to the invention, an optical image offset device for compensating for or producing a lateral offset of an image of an observation object in an optical observation device is provided. The optical image offset device comprises at least two optical wedges which are arranged successively along an optical axis. Each optical wedge is respectively composed of at least two optical elements and has an adjustable wedge angle. The two optical wedges have different refractive indices and different dispersions. In particular, the image offset device may be configured in such a way that the two optical elements of the first optical wedge respectively have the same Abbe number $V_1$ and the same refractive index $n_1$, and the two optical elements of the second optical wedge likewise respectively have the same Abbe number $V_2$ and the same refractive index $n_2$. The refractive index $n_1$ of the first optical wedge, the refractive index $n_2$ of the second optical wedge, the Abbe number $V_1$ of the first optical wedge, the Abbe number $V_2$ of the second optical wedge, the wedge angle $\alpha_1$ of the first optical wedge and the wedge angle $\alpha_2$ of the second optical wedge in this configuration satisfy the relationship:

$$\frac{\alpha_1}{\alpha_2} = -\frac{V_1}{V_2}\frac{n_2 - 1}{n_1 - 1}.$$

Owing to the different refractive indices and dispersions of the at least two wedges with adjustable wedge angles, an achromatic ray deviating effect can be achieved. In this case, a wedge offers the advantage over prisms rotatable about the optical axis that even small control paths are sufficient in order to compensate for a lateral image offset. In the case of prisms rotatable about the optical axis, in the least favorable case it is necessary to carry out a rotation through 180°. In the case of wedge angles, on the other hand, an adjustment movement in the range of single-figure degree numbers is sufficient. Wedge angle control movements of at most 5° are typically sufficient in order to compensate for or produce the lateral image offset.

The two optical elements of an optical wedge may, in particular, respectively be a planoconvex lens having a plane lens face and a convex lens face and a planoconcave lens having a plane lens face and a concave lens face. The convex lens face of the planoconvex lens and the concave lens face of the planoconcave lens have the same radii of curvature and lie facing one another. The radii of curvature can in this case be regarded as equal when the deviation of the radii of curvature from one another is no more than 3%, preferably no more than 1%, in particular no more than 0.2%. The concave lens face and the convex lens face may in this case in particular be spherical faces with a common center. This allows the planoconvex face and the planoconcave face to be moved relative to one another about the center of the radius of curvature even with a minimal gap. In the event of a deviation from the spherical configuration of the faces the maximum possible relative movement between the two faces about the center of curvature depends on the size of the gap between the two faces and on the degree of deviation from the spherical configuration.

Furthermore, configuring the convex and concave lens faces as spherical faces having a common center allows the two mutually opposing lenses of the two optical wedges to be connected rigidly to one another. An adjustment of the wedge angle necessary for compensating for or producing a lateral image offset in two directions can then be carried out by a single rotational movement, common to the two mutually opposing elements, about two axes which extend through the common center of the two elements. In technical terms, guidance which permits rotation about a remote point is possible with the aid of solid-state flexural articulations, also referred to as pivot mountings. A combination of two such flexural articulations with mutually orthogonal axes an image offset combination in an arbitrary lateral direction is possible. Pivot mountings are known from the prior art and will therefore not be explained further here. As an alternative, guiding with the aid of a universal suspension is possible, by which an object can be mounted rotatably about two mutually perpendicular axes. The universal suspension is fundamentally known to the person skilled in the art and will therefore not be explained further here.

The planoconvex lenses of the optical wedges may, in particular, be formed as hemisphere segments when the concave and convex lens faces are formed as spherical faces. Such a configuration makes it possible to arrange the planoconvex lenses of two neighboring optical wedges with their plane faces facing one another. In this arrangement, the planoconvex lenses may be connected to one another in a fixed fashion, and in particular cemented together on their plane faces, in such a way that a full sphere or at least approximately a full sphere is formed. The compensation for or production of the lateral image offset is then carried out by rotating this composite sphere. If the sphere can be rotated about two mutually perpendicular axes, then compensation for or production of a lateral image offset is possible in any direction perpendicular to the optical axis. This configuration with two hemispheres connected to one another is distinguished by the great as possible simplicity in terms of the mechanics and actuators required for the movement to adjust the optical wedges.

It should, however, be pointed out that the order of a planoconvex lens and planoconcave lens in the optical wedges is in principle freely selectable. Likewise, the plane faces of the optical elements of an optical wedge may in principle make any desired angle with the optical axis. In general, however, the angle of the plane faces with respect to the optical axis will lie relatively close to 90° ($\geq 85°$) or will be exactly 90°.

In a particularly advantageous configuration of the invention, there is a film of an immersion medium between the convex lens face of the planoconvex lens of an optical wedge and the concave lens face of the planoconcave lens of the optical wedge. This may have a thickness of at most 5 mm, in particular at most 3 mm. The immersion medium may in this case for example be an immersion oil, a sol-gel or a suitable immersion solution. In particular, the image offset device may be configured in such a way that the refractive index of the immersion medium in the first optical wedge corresponds to the refractive index n1 of the optical elements in the first optical wedge and the refractive index of the immersion medium in the second optical wedge corresponds to the refractive index n2 of the optical elements in the second optical wedge.

When a refractive index-matched immersion oil is used as the immersion medium, the gap between the convex lens face of the planoconvex lens of an optical wedge and the concave lens face of the planoconcave lens of the optical wedge is less than when using a fine optical cement, since the gap corresponds to the thickness of the oil film. The oil film usually has a thickness of less than 0.5 mm, the thickness typically being about 0.05 to 0.1 mm.

When a fine optical cement is used as the immersion medium, the fine optical cement may in particular be based on an epoxy resin or ketone resin. A resilient fine optical cement based on an epoxy resin or ketone resin has a particularly high modulus of elasticity >1000 N/mm2 at room temperature. This modulus of elasticity is high enough that the wedge angle to be adjusted in order to compensate for a lateral image offset only causes shear movements which lie within the reversible elasticity range of the cement layer. The thickness of the resilient cement layer may in this case be selected in such a way that the shear movement, required in order to compensate for or produce an image offset, along the spherical face can be ensured in the reversible elasticity range of the cement layer. In general, this is possible with cement layer thicknesses of from 1 to 2 mm. By increasing the thickness of the cement layer to at most 3 mm, or at most 5 mm, the permissible shear movements can be increased so that a greater adjustment range can be achieved for the wedge angle. If the refractive indices of the optical elements and of the cement layer are matched to one another, disadvantages in terms of the image quality of the optical imaging furthermore do not arise. In particular, by the refractive index-matched immersion medium in the gap between the optical elements of an optical wedge, the undesired optical effect of an air gap between the faces can be eliminated. Without a refractive index-matched immersion medium, such an air gap would generate very strong optical aberrations, which would drastically reduce the image quality.

The at least two optical wedges of the optical image offset device may consist of glass or plastic, the two optical elements of an optical wedge respectively consisting of the same glass or the same plastic. In other words, the compensation for the chromatic aberration is brought about not inside a wedge but by the interaction of the at least two wedges.

In one configuration of the optical image offset device, which allows relatively simple mechanics, two optical wedges are provided, the adjustable wedge angles of which are equal in magnitude but different in sign for each wedge angle to be adjusted. This may, in particular, be achieved by the configuration already described with two hemispherical elements assembled to form a full sphere. Yet even when the mutually opposing optical elements of two neighboring wedges are not connected to one another, it is still possible to achieve the described configuration with wedge angles equal in magnitude but different in sign.

According to a second aspect of the invention, an optical image stabilization device is provided. It comprises an optical image offset device according to the invention, actuators for adjusting the wedge angles of the optical wedges in the optical image offset device on the basis of a control signal, which represents the wedge angles to be adjusted, an offset determination instrument and a control instrument. The offset determination instrument is intended for determination of the offset of an image of an observation object with respect to the optical axis of an optical observation apparatus and for output of an offset signal representing the offset which has been determined. The control instrument is connected to the offset determination instrument for reception of the offset signal. The control instrument determines the control signal on the basis of the received offset signal. In order to output the control signal, the control instrument is connected to the actuators.

The image stabilization device according to the invention makes it possible to stabilize an image recorded with an optical observation apparatus, by compensating for lateral deviations of the image in relation to the optical axis of the observation apparatus with the aid of suitable adjustments of the wedge angles in the optical image offset device. In this way, for example, it is possible to compensate for vibrations of a stand or hand trembling in the case of observation apparatuses held by hand. The optical image offset device according to the invention in this case makes it possible for the optical image stabilization device to stabilize the image stabilization with small movements of the compensating wedges while maintaining a high optical quality of the generated image.

The offset determination instrument in the optical image stabilization device may, for example, comprise a movement sensor for detecting a movement of the optical observation apparatus, for instance an acceleration sensor or a gyro sensor. These measure inertia forces and thereby make it possible to determine lateral accelerations and angular accelerations. The chronological sequence of acceleration signals may be integrated in the control unit. With the aid of the focal length of the observation optics and the object distance, it is firstly possible to determine there from the relative velocity with which the image moves laterally, i.e. perpendicularly to the optical axis, relative to the optical observation apparatus. From the relative velocity of the movement, it is then possible to determine the lateral offset of the image, resulting from the movement, in relation to the optical axis of the observation apparatus as well as the control movements required in order to compensate therefor. If the movement of the observation object relative to the optical observation apparatus is negligible, the absolute movement of the optical observation apparatus, determined by the acceleration sensors or gyro sensors, represents a good approximation of the relative movement between the observation object and the optical observation apparatus. This assumption is satisfied to a sufficient approximation in many cases, for example in the case of optical observation apparatuses with which distant objects are observed or recorded, for instance cameras or telescopes.

As an alternative, the offset determination instrument may comprise a device for sighting or tracking a reference point in the image generated by the optical observation apparatus. Such systems are known as tracking systems. With the aid of such systems, a relative movement between the observation object and the optical observation apparatus can be determined directly.

According to a third aspect of the invention, an optical observation apparatus having an optical axis is provided. The optical observation apparatus is equipped with an optical image offset device according to the invention or with an optical image stabilization device according to the invention. The wedges of the optical image offset device are in this case arranged along the optical axis of the optical observation apparatus. Such an optical observation apparatus makes it possible to compensate for or produce an image offset without moving the optical observation apparatus itself and, if the image offset device is part of an image stabilization device, to compensate for movements such as vibrations or hand trembling.

An optical observation apparatus typically has an objective or main objective. The optical image offset device may in this case be arranged before the objective, particularly if the optical observation apparatus is a telescope, binoculars or a camera.

If the optical observation apparatus has observation optics which comprise a collimated beam path, i.e. an at least approximately parallel beam path, the optical image offset device may be arranged in the collimated beam path instead of before the objective. Optical observation apparatuses which have a collimated beam path in the observation optics are, for example, stereomicroscopes such as operation microscopes. Binoculars or telescopes may, however, also contain optics having a collimated beam path. Specifically, the optical image offset device according to the invention is suitable in particular for use in a parallel beam path, such as exists before the objective when observing distantly arranged observation objects or, in the case of observation optics having a collimated beam path, in this collimated beam path. By arrangement in a parallel beam path, it is possible to avoid the generation of imaging errors by the optical wedges. If the observation optics have a collimated beam path and the image offset device is arranged in the collimated beam path, it is also possible to compensate for or produce an image offset of observation objects which lie in the near field of the observation optics, as is important for example in the case of microscopes, particularly operation microscopes.

If the optical image offset device lies in a collimated beam path and the observation optics of the optical observation apparatus have at least one aperture stop plane, it is advantageous to arrange the optical image offset device in the aperture stop plane or immediately next thereto. Arrangement immediately next to the aperture stop plane is necessary and expedient in particular when there is another optical element in the aperture stop plane, for instance a physical diaphragm. Arranging the optical image offset device in the aperture stop plane or immediately next to the aperture stop plane offers the advantage that the required free diameters of the optical wedges can be kept minimal.

The optical observation apparatus may also comprise observation optics having at least two optical image sub-channels. In this case, an optical image offset device may respectively be arranged in each image sub-channel. In particular, the optical observation apparatus may comprise precisely two optical image sub-channels, which is generally the case with stereomicroscopes or binoculars. In an optical observation apparatus which comprises observation optics having at least two optical image sub-channels and an optical image offset device respectively in each image sub-channel, there is a synchronization instrument which ensures that the optical image offset devices in all the image sub-channels are synchronized when adjusting the wedge angles and follow a common control signal.

Other features, properties and advantages of the present invention may be found in the following description of exemplary embodiments with reference to the appended figures.

BRIEF DESCRIPTION OF THE DRAWINGS

FIGS. 3 to 5 show a specific example of an operation microscope having an optical image offset device, for different wedge angles.

DETAILED DESCRIPTION OF THE PREFERRED EMBODIMENTS

Figure 1:
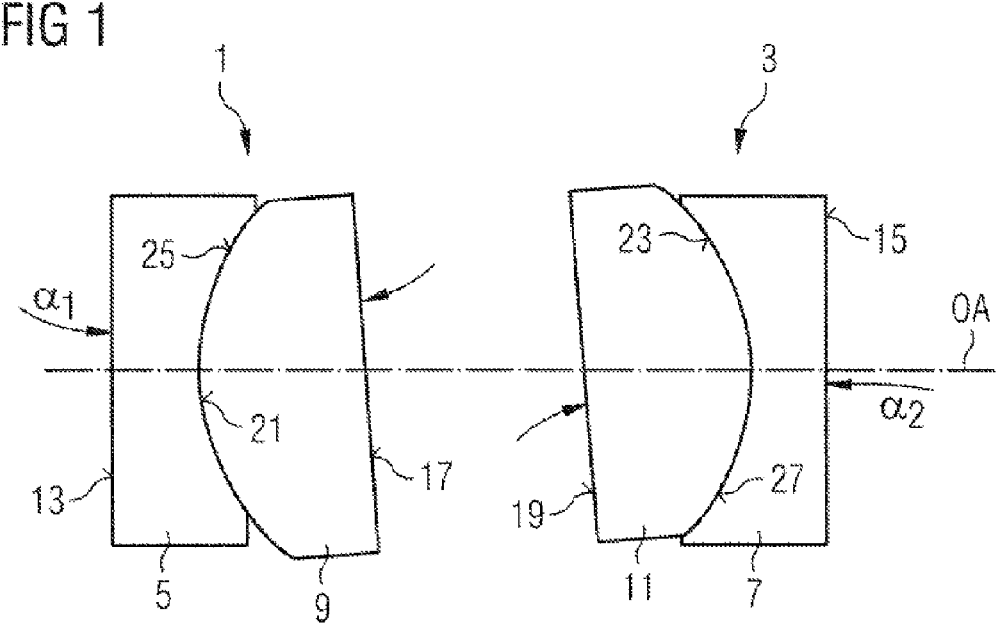
FIG. 1 shows an optical image offset device in a schematic representation.

An exemplary embodiment of an image offset device according to the invention is represented in FIG. 1. The image offset device comprises two optical wedges 1, 3, which are to be arranged along an optical axis OA in an optical observation apparatus. The term optical observation apparatus is intended here to include all optical devices with which an observation object can be observed directly, for instance a telescope, binoculars, a microscope, etc., or with which an observation object can be recorded for indirect or future observation, for example a photographic or video camera, a microscope having an electronic image sensor or a telescope having an electronic image sensor.

The exemplary embodiments which follow will be described with reference to the compensation for a lateral image offset. It is, however, to be understood that the image offset devices described in the exemplary embodiments may likewise be used to produce a lateral image offset.

Each of the two optical wedges 1, 3 is composed of two optical elements, namely a planoconcave lens 5, 7 and a planoconvex lens 9, 11. The planoconcave lenses 5, 7 and the planoconvex lenses 9, 11 respectively have a plane lens face and a curved lens face 21, 23, 25, 27. In the present exemplary embodiment, the curved lens faces are respectively spherical lens faces. Furthermore, the spherical lens faces of the two elements of an optical wedge 1, 3 in the present exemplary embodiment face one another, there being a refractive index-matched immersion medium between the two spherical lens faces. In the present exemplary embodiment, a refractive index-matched immersion oil or a refractive index-matched fine optical cement may for example be used.

If a refractive index-matched fine optical cement is used, the spherical lens faces of the two elements of an optical wedge 1, 3 are cemented together by means of the refractive index-matched resilient fine optical cement, the fine cement according to the exemplary embodiment being a fine cement based on an epoxy resin or ketone resin. Such a resilient fine optical cement has a modulus of elasticity >1000 N/mm2. The thickness of the resilient fine cement lying between the spherical faces is then from 1 to 2 mm. In this way, the wedge angles required in order to compensate for an image offset can be adjusted without the shear movements resulting therefrom departing from the reversible elasticity range of the cement layer. It is to be understood that, in the case of large wedge angles, a thicker cement layer is used in order to keep the shear movements occurring in the cement small. Thus, cement layers with a thickness of up to about 5 mm may be employed. For typical applications, however, layer thicknesses of at most 3 mm are generally sufficient.

If, instead of a fine optical cement, a refractive index-matched immersion oil is used as the immersion medium, the gap between the spherical lens faces of the two elements of an optical wedge 1, 3 is very much smaller than when using a fine optical cement, since the thickness of the oil film is only about 0.05 to 0.1 mm. Furthermore, the gap is sealed against egress of the liquid immersion medium. The use of an immersion oil offers the advantage over the use of a fine optical cement that, with immersion oils, there is no risk of stress-induced birefringences such as may sometimes occur with fine optical cements. Furthermore, immersion oils are even available with refractive indices of more than about n=1.6, whereas fine optical cements are only available up to refractive indices of about n=1.6.

The resilient fine optical cement between the spherical lens faces of a planoconvex lens 9, 11 and a planoconcave lens 5, 7 in an optical wedge 1, 3 permits a shear movement between the two spherical faces, with the fine cement nevertheless remaining bonded firmly to the respective lens faces on account of adhesion forces. Air bubbles, striations or other perturbing effects can thus be avoided. Furthermore, resilient fine optical cements have very good thermal and aging stability, so that high light transmission is maintained even when light shines through intensely for a prolonged period of time.

Instead of the resilient fine optical cement, a different refractive index-matched immersion medium may be arranged between the spherical lens faces of the planoconvex lens and the planoconcave lens of an optical wedge 1, 3. For example, an immersion oil, a sol-gel or an immersion solution may be used as the immersion medium. Compared with other refractive index-matched immersion media, however, the resilient fine optical cement offers the advantage that leakage or evaporation of liquids is precluded, without special sealing measures such as sleeves, bellows or the like being necessary.

By means of suitable actuators, the planoconvex lens 9, 11 of an optical wedge 1, 3 can be rotated about the common center of the spherical faces of an optical wedge. In this way, it is possible to adjust the wedge angle α between the plane faces 13, 17 or 15, 19 of an optical wedge. In the present exemplary embodiment, the actuators are configured in such a way that the wedge angles α1, α2 of the two optical wedges 1, 3 are equal in magnitude but differ in their sign. As actuators for adjusting the wedge angle α, it is possible for example to use pivot mountings or a universal suspension, as are known from the prior art. Although the planoconvex lens is rotated in the exemplary embodiment described, in principle it is also possible to rotate the planoconcave lens so long as the plane lens face remains fully in the beam path during this.

Figure 2:
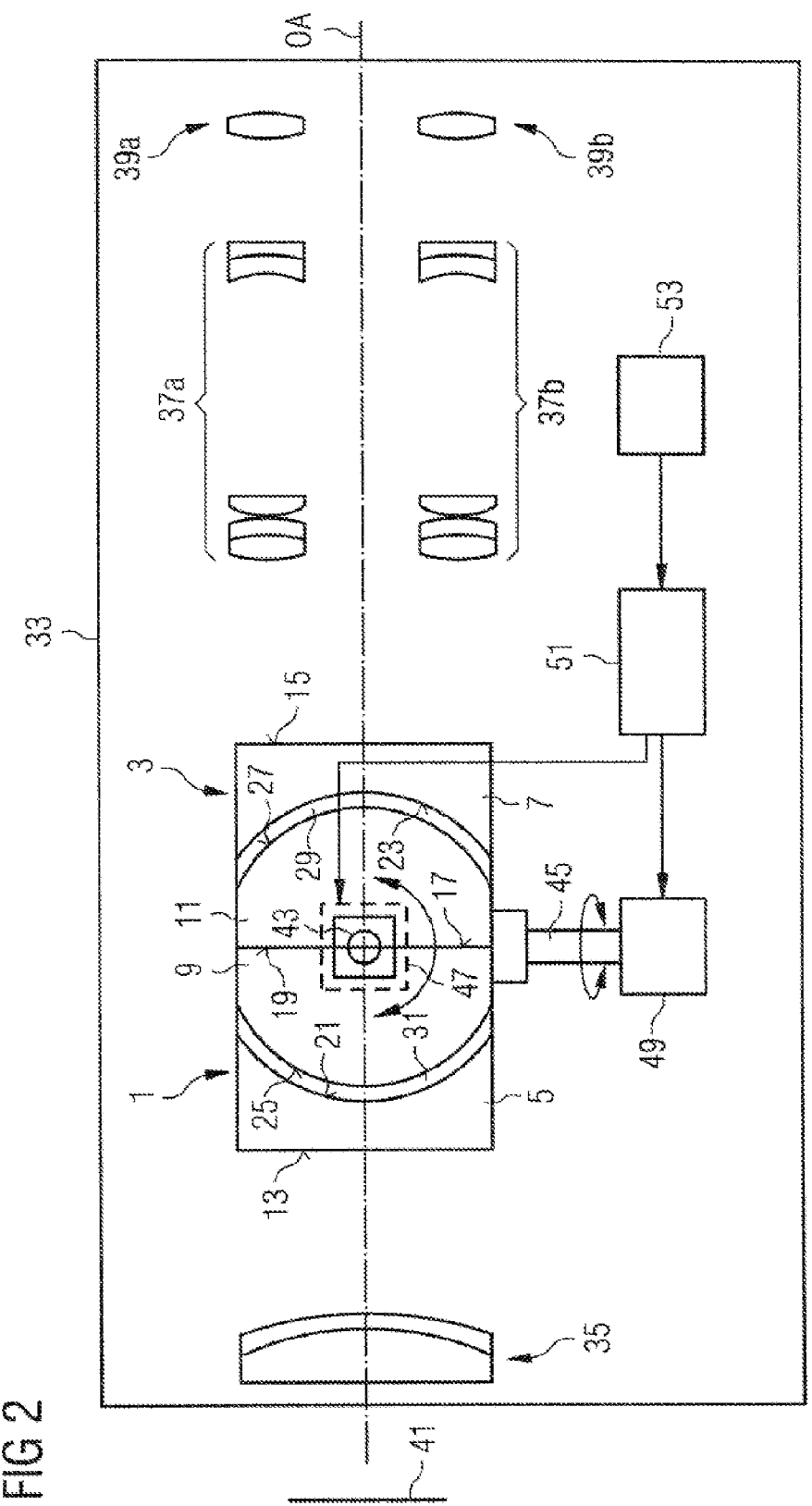
FIG. 2 shows an optical observation apparatus having an image stabilization device.

In the image offset device, it is possible in principle to provide separate actuators for each optical wedge 1, 3. Particularly when small-magnitude wedge angles with different signs are used, however, it is also possible to provide common actuators for both wedges. In this case, the mutually facing optical elements of the two wedges 1, 3, i.e. in the present exemplary embodiment the planoconvex lenses 9, 11, may be rigidly coupled to one another. In this case, it is in particular also possible to cement the two planoconvex lenses 9, 11 of the optical wedges 1, 3 together on their plane faces 17, 19, as is shown in FIG. 2. If the two planoconvex lenses 9, 11 have equal dimensions, a full sphere segment is thereby formed, the center of the full sphere extending through the plane in which the two planoconvex lenses are connected to one another. The actuators may in this case be configured in a particularly straightforward way.

The two optical wedges 1, 3 may be formed from glass or plastic, the planoconvex lens and the planoconcave lens of a wedge respectively being made from the same glass or plastic. The resilient fine cement between the planoconcave lens and the planoconvex lens of an optical wedge is in this case matched to the glass used, or the plastic used, in such a way that its refractive index substantially corresponds to the refractive index of the glass or plastic.

The material of the optical wedges 1, 3 is selected in such a way that the two optical wedges 1, 3 have a different dispersion and a different refractive index. For example, the planoconcave lens 5 and the planoconvex lens 9 of the first optical wedge may be made from a glass or plastic having a higher refractive index and a lower dispersion, while the planoconcave lens 7 and the planoconvex lens 11 of the second optical wedge 3 are made from a glass or plastic having a lower refractive index and a higher dispersion. In this way, it is possible to produce an achromatic optical wedge having approximately wavelength-independent ray deviation. In a specific example, the lenses of the first optical wedge may be formed from a high-index crown glass such as, for example, NLAK9 or NLASF44, while the planoconcave lens 7 and the planoconvex lens 11 of the second optical wedge 3 are formed from a low-index flint glass such as, for example, NF2 or NF5. The respectively used resilient fine cements are selected in such a way that their refractive power corresponds to the type of glass respectively used. As resilient fine cements are only available up to refractive indices of about n=1.6, when using types of glass with a refractive index of more than about 1.6 (for example NLASF44), immersion oils are employed, which are even available with refractive indices of more than n=1.6, as the immersion medium between the spherical lens faces of a planoconvex lens 9, 11 and a planoconcave lens 5, 7.

It is, however, not necessary for the two optical wedges 1, 3 both to be made of glass or both to be made of plastic. It is also possible to make one optical wedge from glass and the other optical wedge from plastic. In the example above, for instance, it is possible to replace the low-index flint glass with an optical plastic, such as for example polycarbonate, so that the first optical wedge 1 is made of glass and the second optical wedge 3 is made of plastic.

Although only two optical wedges are represented in FIG. 1, the optical image offset device may also comprise more than two optical wedges. At least two optical wedges are, however, necessary in order to be able to ensure a high image quality.

In general, the ray deviation by the two optical wedges 1, 3, of which the first has a wedge angle $\alpha_1$ and the second has a wedge angle $\alpha_2$, is independent of the wavelength precisely when the optical media of the two wedges, i.e. the glass or plastic, with the refractive indices $n_1$ and $n_2$ and the Abbe numbers $V_1$ and $V_2$ satisfy the following relationship:

$$\frac{\alpha_1}{\alpha_2} = -\frac{V_1}{V_2}\frac{n_2-1}{n_1-1} \qquad (1)$$

As already mentioned, the two wedge angles α1 and α2 may be equal in magnitude and have different signs. In this case, the two wedges may, as already described, be adjusted by a single common rotational movement. Furthermore, Relationship (1) is simplified to give:

$$\frac{V_2}{V_1} = \frac{n_2-1}{n_1-1} \qquad (2)$$

In order to achieve a good image quality, particularly with very small chromatic errors, the relationship above must be satisfied.

As an exemplary embodiment of an optical observation apparatus having an optical image stabilization device according to the invention, FIG. 2 shows an operation microscope 33 in a highly schematized representation. As its essential components, the operation microscope comprises a main objective 35, a magnification changer 37a, 37b and tube optics 39a, 39b. In the present exemplary embodiment, the optical image offset device of the optical image stabilization device is arranged between the main objective 35 and the magnification changer 37a, 37b.

The main objective 35 of the operation microscope 33 may, as represented in the present exemplary embodiment, be formed as an achromatic or apochromatic lens of fixed focal length. The observation object 41 is arranged in the focal plane of the main objective 35, so that it is imaged at infinity by the main objective 35. A divergent ray bundle coming from the observation object 41 is thus converted into a parallel ray bundle (collimated ray bundle) when it passes through the main objective 35. Instead of just one achromatic or apochromatic lens, the main objective 35 may also comprise an objective lens system consisting of a plurality of individual lenses, for example so-called varioscope optics with which the working distance of the operation microscope 33, i.e. the distance of the focal plane from the objective 35, can be varied. In such a vario-system as well, the observation object 41 arranged in the focal plane is imaged at infinity, so that there is also a collimated beam after passing through the objective in the case of a vario-objective.

The magnification changer 37a, 37b in the present exemplary embodiment is formed as a zoom system for continuous variation of the magnification factor. In a zoom system, which is constructed for example from a lens combination comprising three lenses, the two lenses on the object side can be displaced in order to vary the magnification factor. In fact, however, the zoom system may also comprise more than three lenses, for example four or more lenses, in which case the outer lenses may be arranged fixed. Instead of a zoom system, it is also possible to use a Galilean changer as the magnification changer. In one of these, continuous variation of the magnification factor is not possible. Instead, there are a plurality of fixed lens combinations, which represent different magnification factors and can alternatively be introduced into the beam path. Both a zoom system and a Galilean changer convert an incident parallel ray bundle into an emergent parallel ray bundle having a different bundle diameter.

The magnification changer 37a, 37b in the present exemplary embodiment is part of the binocular beam path of the operation microscope, that is to say it respectively has a separate lens combination for the stereoscopic sub-beam paths of the operation microscope 33.

The tube optics 39a, 39b, only represented extremely schematically, represent a binocular tube which, depending on the application field, comprises either eyepieces for observation of the observation object 41 or image sensors for indirect observation of the observation object and for recording the observation object.

The optical image offset device in the present exemplary embodiment is arranged in the collimated beam path between the main objective 35 and the zoom system 37a, 37b. The plane lens faces 13, 15 of the two planoconcave lenses 5, 7 in this case face the main objective 35 and the zoom system 37a, 37b. The plane lens faces 17, 19 of the planoconvex lenses 9, 11 are cemented together in the image offset device represented, so that together they form a sphere segment. The planoconvex lenses 9, 11 are respectively connected by means of a resilient fine optical cement 29, 31 to the associated planoconcave lens 5, 7 of the corresponding optical wedge 1, 3.

The sphere segment formed by the two planoconvex lenses 9, 11 can be rotated by means of actuators, which in the present exemplary embodiment are merely represented in a highly schematized way by rotation axes 43, 45, about two axes extending perpendicularly to one another. The possible rotation angles are in this case relatively small, and in the present exemplary embodiment lie in the range of between −5° and +5°. The rotation is carried out by means of precisely adjustable motors 47, 49, which adjust the rotational position of the spherical element formed by the planoconvex lenses 9, 11 on the basis of a received control signal with the aid of solid-state flexural articulations in the scope of pivot mounting or a universal mounting, respectively. The control signal is determined by a control which, besides the motors 47, 49, is also connected to an acceleration sensor 53 for reception of an acceleration signal representing the acceleration of the operation microscope 33.

In the present exemplary embodiment, the observation object may essentially be assumed to be immobile. Movements which lead to a lateral image offset are then due exclusively to a movement of the operation microscope 33. This can be determined with the aid of the acceleration sensor 53, by integrating the recorded accelerations in the control unit 51. On the basis of the integrated accelerations, the control unit 51 then determines the image offset to be compensated for and from this, in turn, the control signal for the control motors 43, 49. If the image offset to be compensated for is attributable, for example, to vibrations of the operation microscope 33, then it is possible in particular to precalculate the control signals with the aid of parameterized vibration profiles, so that the control signals can be delivered promptly to the motors 43, 49 in such a way that it is possible to compensate for a delay between the output of the control signal and the adjustment of the actual wedge angle. Furthermore, the adjustment of the wedge angles can be carried out with smaller accelerations, so that the generation of vibrations by the adjustment process can be substantially avoided.

As mentioned above, the observation object 41 is assumed to be positionally fixed, so that its movement relative to the operation microscope 33 can be neglected. If this is not the case, it is possible to measure the relative movement between the operation microscope 33 and the observation object 3 directly by sighting or tracking a reference point of the object in the recorded image. This may be carried out with a tracking system, such as is fundamentally known in the prior art.

It is advantageous for the optical image offset device to be arranged in or in the vicinity of an aperture stop plane of the operation microscope optics, since the required free diameters for the lenses 5, 7, 9, 11 of the optical wedges 1, 3 can thereby be minimized. If there is an optical element in the selected aperture stop plane, for instance an aperture stop, it is expedient to arrange the optical wedges 1, 3 immediately before or after the corresponding aperture stop plane. If the planoconvex lenses of the optical wedges 1, 3 are not cemented together, it is also possible to arrange one optical wedge immediately before the aperture stop plane and one optical wedge immediately after the aperture stop plane.

The exemplary embodiment shown in FIG. 2 represents only one possible position for the image offset device in the beam path of the operation microscope. An alternative position would exist between the magnification changer and the binocular tube.

The compensation for a lateral image offset with the aid of an image stabilization device according to the invention will be described in more detail below with reference to FIGS. 3 to 20 with the aid of specific examples.

1st Specific Example

In the example represented in FIGS. 3 to 8, the binocular tube is equipped with camera adapter optics and an image recording sensor. The image stabilization device may, however, also be used in an identical form for visual observation of the observation object. The object field is circular and has a diameter of about 36 mm.

The representations of FIGS. 3 to 8 are based on an image offset device in which the planoconcave lens 5 and the planoconvex lens 9 of the first optical wedge 1 are made of the glass KF9 with the refractive index 1.523412 and the Abbe number 51.4930 at 546 nm. The planoconcave lens 9 and the planoconvex lens 11 of the second optical wedge 3 are made of the glass SK16 with the refractive index 1.620410 and the Abbe number 60.3236. In these types of glass, V2/V1=1.17 and (n2−1)/(n1−1)=1.18, so that Condition (2) described above is satisfied to a good approximation. The optical wedges 1 and 3 are represented in a highly schematized way in FIGS. 3 to 5 for the sake of simplicity. The figures respectively show only the plane faces 13, 15, 17, 19 of the planoconcave lenses 5, 7 and of the planoconvex lenses 9, 11, but not the interfaces 21, 23, 25, 27 between the planoconcave lenses 5, 7 and the planoconvex lenses 9, 11 of a wedge 1, 3.

The resilient fine optical cement 31 in the first optical wedge 1 may then for example be the cement OK2066F which has a refractive index n=1.529, i.e. a refractive index very similar to the refractive index of the glass KF9. The resilient fine optical cement 29 of the second optical wedge 3 may be an opto-cement OK227 which, with a refractive index of n=1.625, has a very similar refractive index to the glass SK16.

The maximum offset, on which the figures are based, of the operation microscope 33 relative to the observation object 41 is 3 mm in each direction. Since positive and negative directions are equivalent for reasons of symmetry and arbitrary intermediate positions provide no further information, three positions will respectively be shown by way of example below.

In the first position (FIG. 3) of the image offset device, which is to be regarded as a neutral position, the wedge angle relative to each of the two rotation axes 43, 45 (cf. FIG. 2) is 0°. In other words, the plane faces of the optical wedges 1, 3 all extend parallel to one another and perpendicularly to the optical axis OA. This position is occupied when there is no lateral offset of the operation microscope 33 in relation to the observation object 41, that is to say when Δx=0 and Δy=0. The y axis extends in the figures from the bottom upwards in the plane of the page, the x axis extends into the plane of the page and the z axis extends along the optical axis OA from left to right in the plane of the page. The image error curves for this position of the optical wedges 1, 3 are represented in FIG. 6.

The position represented in FIG. 4 corresponds to a lateral offset between the operation microscope and the observation object 41 in the y direction by −2 mm. This offset is compensated for by rotation of the planoconvex lenses 9, 11 about the x axis (43 in FIG. 2) through an angle of 3.926°. In this case, the sub-angle α1 of the optical wedge 1 facing the main objective 35 has a negative sign and the wedge angle of the optical wedge 3 facing the zoom system 37 has a positive sign. The corresponding image error curves are represented in FIG. 7.

FIG. 5 shows an offset between the operation microscope 33 and the observation object 41 both in the x direction and in the y direction. The offset is +2 mm in both directions, that is to say Δx=+2 mm and Δy=+2 mm. This offset is compensated for by rotating the planoconvex lenses 9, 11 of the optical wedges both through an angle of α=3.926° about the x axis and through an angle β=3.926° about the y axis. The wedge angles α1, α2 respectively have a magnitude of 3.926° in FIG. 5, the wedge angle α1 of the wedge 1 facing the main objective 35 having a positive sign and the wedge angle α2 of the wedge 3 facing the zoom system 37 having a negative sign. The wedge angles β1, β2 also have a magnitude of 3.926°, the wedge angle β1 of the optical wedge 1 facing the main objective 35 having a negative sign and the wedge angle β2 of the optical wedge 2 facing the zoom system 37 having a positive sign. The corresponding image error curves are represented in FIG. 8.

Figure 6:
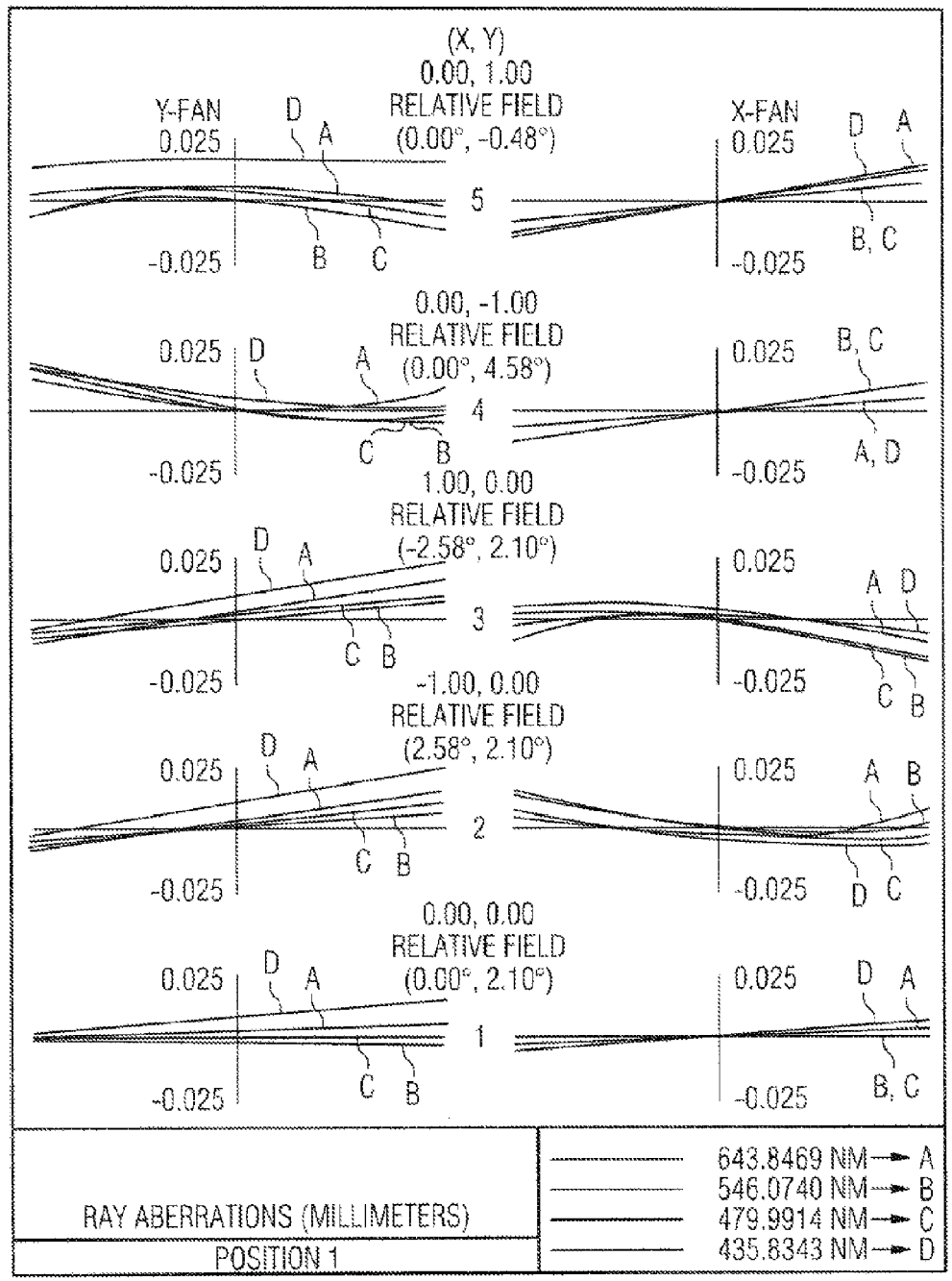
FIGS. 6 to 8 show image error curves for the wedge angles shown in FIGS. 3 to 5.
Figure 7:
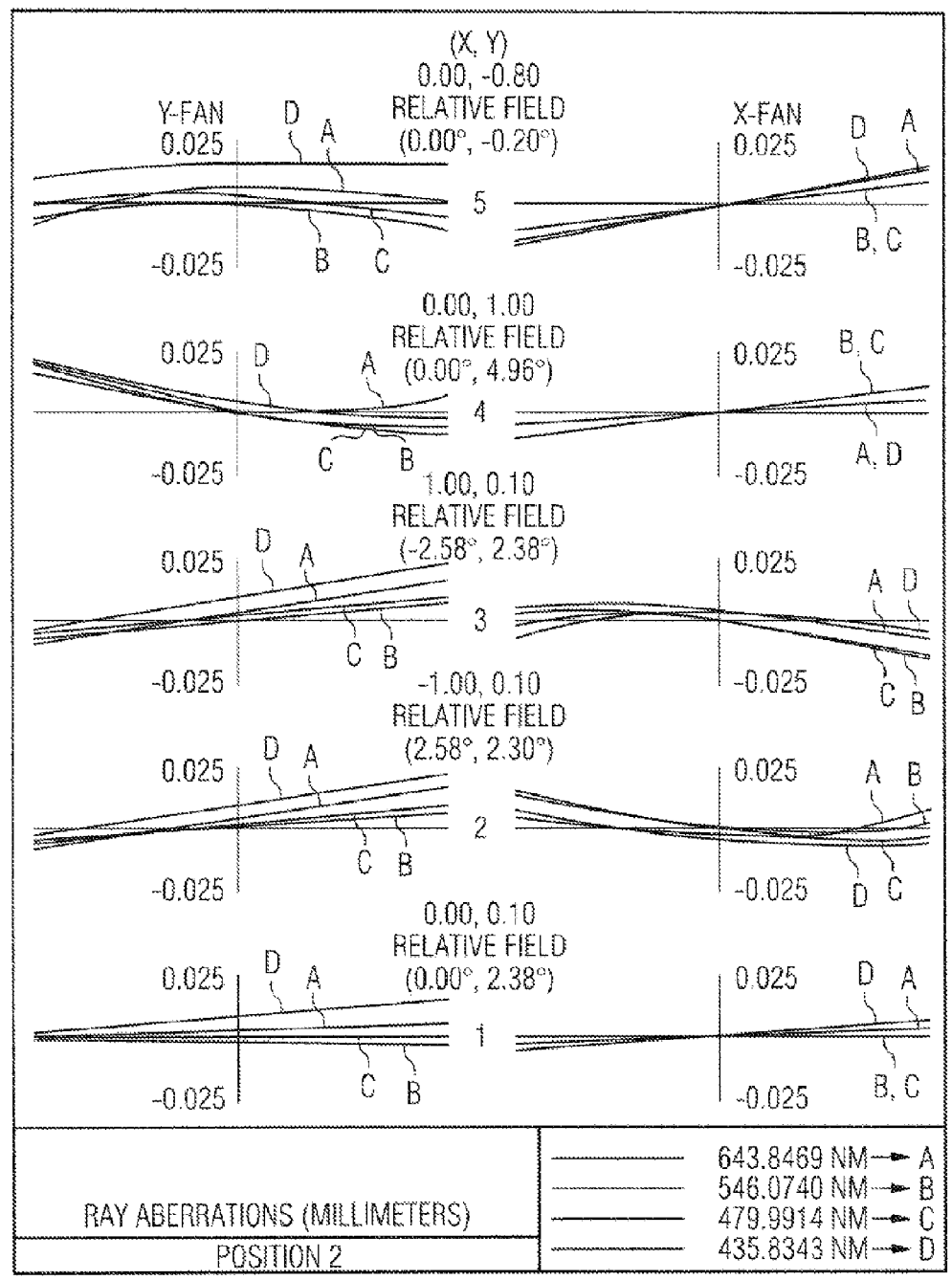
Figure 8:
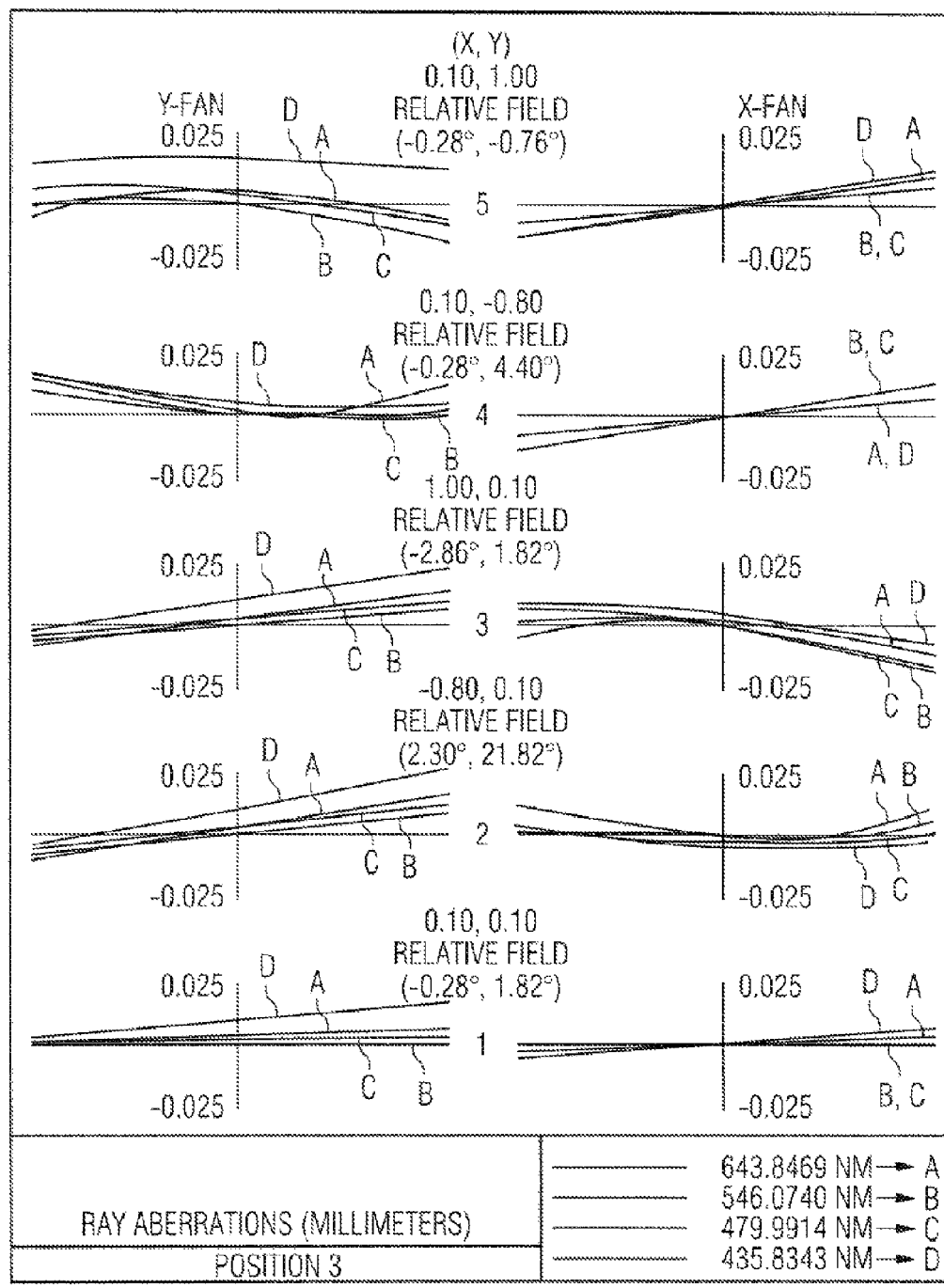

The image error representations shown in FIGS. 6 to 8 represent the geometrical transverse aberration for the wedge angles represented in FIGS. 3 to 5. It can be seen that the variations of the image errors also remain minimal when image offset compensation is carried out by means of the optical wedges 1 and 3, i.e. the optical wedges are brought from the neutral position (FIG. 3) into a position (FIG. 4 or FIG. 5) corresponding to an image offset. In particular no additional chromatic errors occur as a result of the compensation. This would be dramatically different if two types of glass which do not satisfy the condition described above were used for the optical wedges 1 and 3, or if only a single optical wedge were used. The slight image error variations nevertheless to be seen in FIGS. 6 to 8 are attributable not to the compensation by the optical wedges 1, 3 but to the fact that the main objective 35 is used with a slightly off-centered image circle during the compensation for a lateral image offset. The circumscribing image circle, with which the objective is used, is about 40 mm for a lateral image offset by mm in the y direction and about 41.6 mm for a lateral image offset respectively by 2 mm in the x direction and in the y direction. This is somewhat more than the image circle for which the objective is configured. The two optical wedges 1, 3, on the other hand, generate virtually no image errors.

In the case of the offset described with reference to FIG. 5, the greatest variations in the image quality take place over the entire compensation range. These are however entirely negligible in practice, as shown by comparison of the image error curves for the neutral position (FIG. 6) with the image error curves for the compensation for the offset both in the x direction and in the y direction, respectively by 2 mm (FIG. 8).

2nd Specific Example

In a variant of the specific example described with reference to FIGS. 3 to 8, higher-index matched glasses are used. This offers the advantage that the wedge angles α, β required in order to compensate for a lateral image offset become smaller, so that simplified actuators are possible and smaller acceleration forces occur during the adjustment of the wedge angles. Since resilient fine optical cements are only available for refractive indices up to slightly more than n=1.5, high-index immersion oils are provided as the immersion medium between the spherical faces of the optical wedges 1, 3 in this alternative embodiment.

As the type of glass in the scope of the variant, the glass F2 with a refractive index n1=1.620 and an Abbe number V1=36.37 is used in the optical wedge facing the main objective 35. As the glass for the optical wedge 3 facing the zoom system 37, the glass NLASF44 with a refractive index n2=1.804 and V2=46.50 is used. Condition (2) mentioned above is also in this case satisfied to a good approximation since, for the two types of glass, V2/V1=1.28 and (n2−1)/(n1−1)=1.29.

Figure 9:
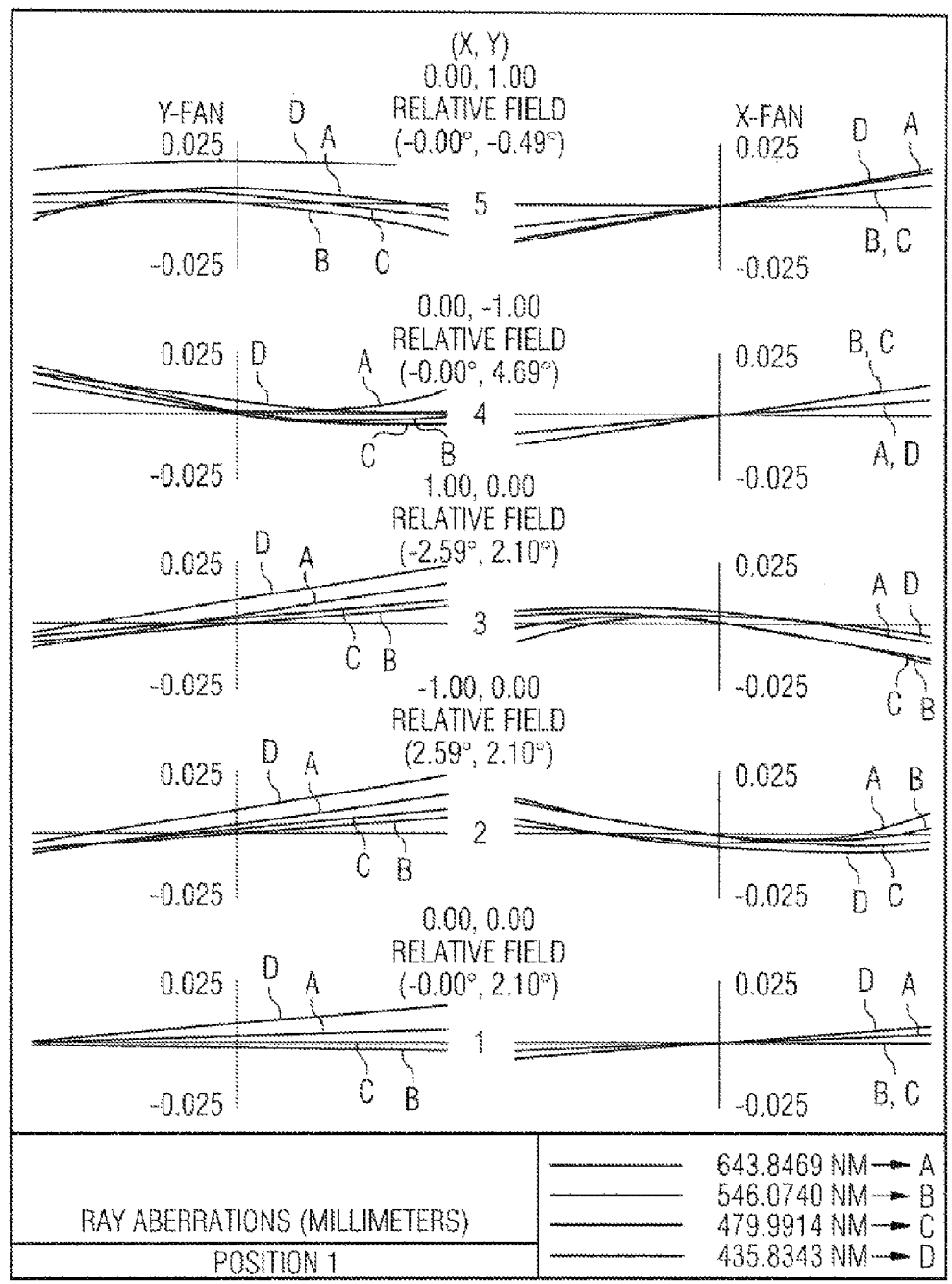
FIGS. 9 to 11 show image error curves for a variant of the exemplary embodiment shown in FIGS. 3 to 5.
Figure 10:
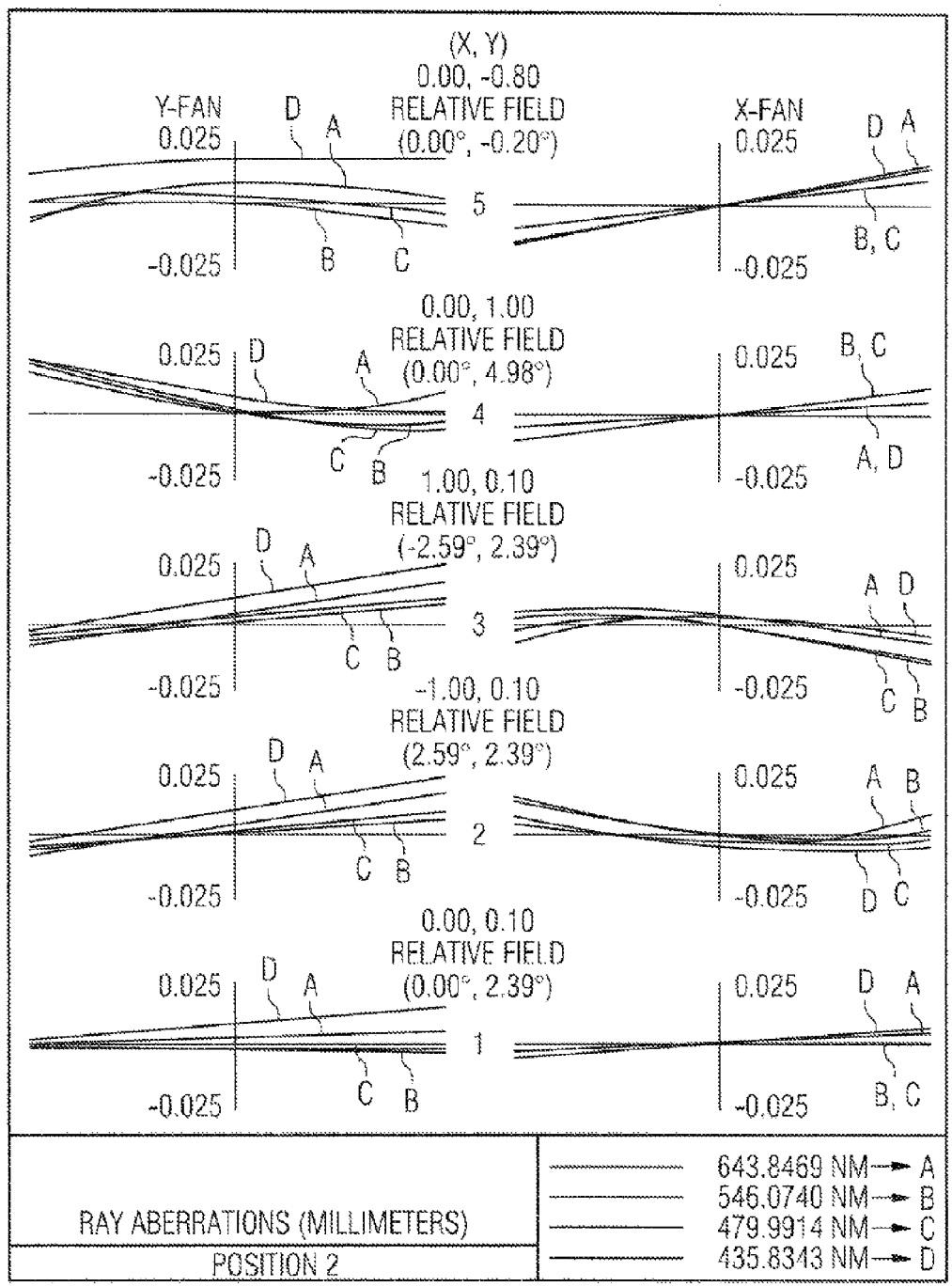
Figure 11:
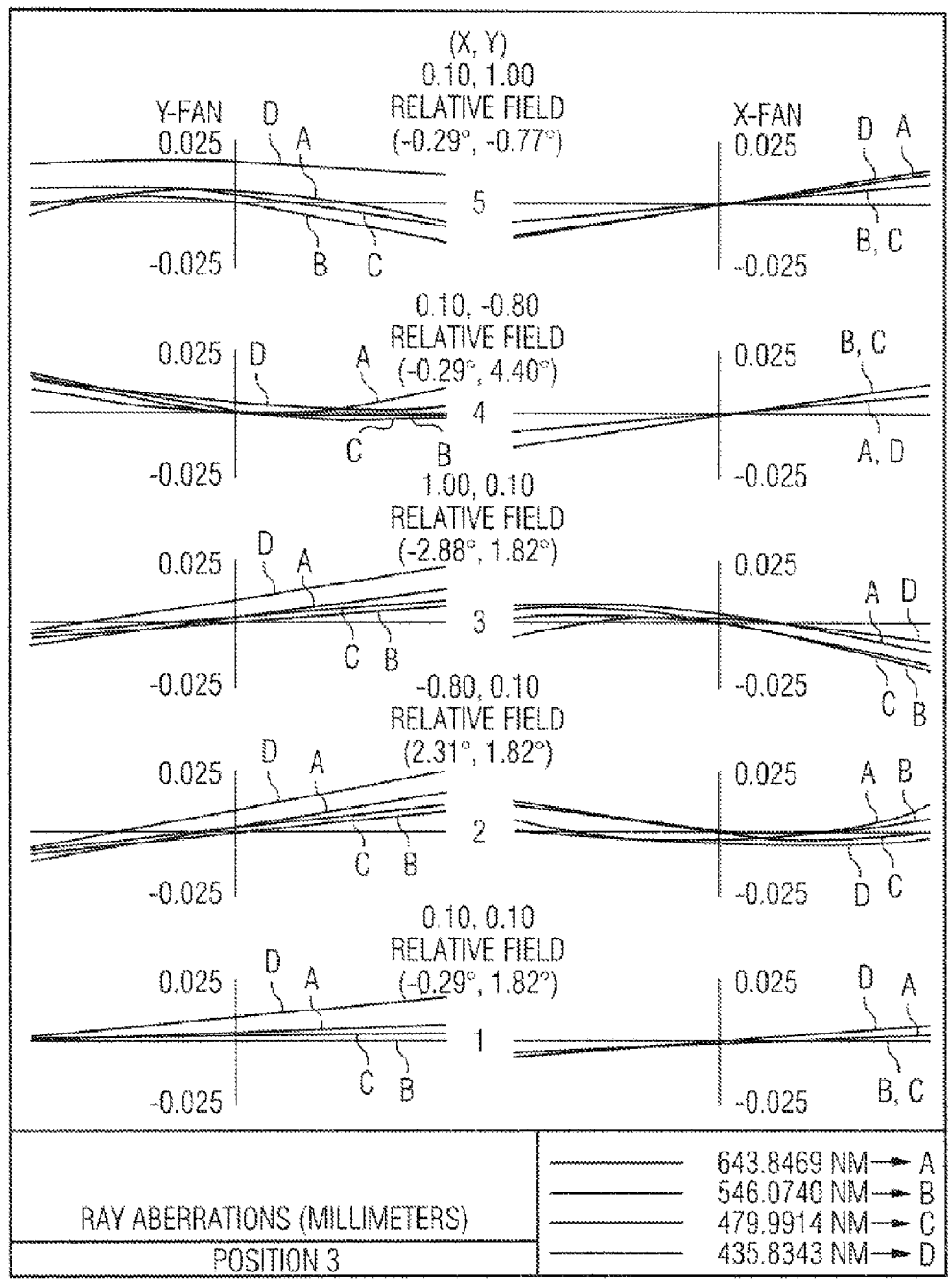

In the compensation positions represented in FIGS. 3 and 5, merely compensation angles having a magnitude of 1.94° are required, instead of 3.926°. FIGS. 9 to 11 in turn show the image error curves for the position shown in FIG. 3, FIG. 4 and FIG. 5, FIG. 9 showing the image error curves for the position shown in FIG. 3, FIG. 10 showing the image error curves for the position shown in FIG. 4 and FIG. 11 showing the image error curves for the positions shown in FIG. 5. It can be seen that virtually no image errors are generated by the compensation for the lateral image offset.

3rd Specific Example

A further specific example of an operation microscope having an optical image stabilization device is shown schematically in FIGS. 12 to 17, FIGS. 12 to 14 representing the operation microscope with a compensation position of the image offset device corresponding to FIGS. 3 to 5. The types of glass and types of cement used correspond to those in the specific example described with reference to FIGS. 3 to 8. The optical wedges 1 and 3 are represented in a highly schematized way for the sake of simplicity in FIGS. 12 to 14 as in FIGS. 3 to 5. The figures respectively show only the plane faces 13, 15, 17, 19 of the planoconcave lenses 5, 7 and of the planoconvex lenses 9, 11, but not the interfaces 21, 23, 25, 27 between the planoconcave lenses 5, 7 and the planoconvex lenses 9, 11 of a wedge 1, 3.

The difference from the specific example of an operation microscope described with reference to FIGS. 3 to 8 is that, instead of a large image offset device common to both stereoscopic sub-beam paths, there is now a separate optical image offset device in each stereoscopic sub-beam path (for the sake of clarity, only one of the stereoscopic sub-beam paths is respectively represented in the figures which show the specific examples). The structure and driving of the optical image offset devices arranged in the sub-beam paths respectively correspond to the structure described with reference to FIG. 2 and to the driving described with reference to FIG. 2. Owing to the fact that there is a separate image offset device in each stereoscopic sub-beam path, the diameters of the optical wedges can be reduced to one third in comparison with the large image offset device. In this way, it is possible to configure the entire optical image stabilization device very compactly. Furthermore, the masses to be moved are reduced significantly in comparison with the use of a large optical image compensation device, so that the acceleration forces required in order to adjust the wedge angles are reduced. Likewise reduced is the shearing of the resilient fine optical cement lying between the lenses, so that thinner cement layers are possible.

Since the rotation points for the adjustment of the wedge angles are respectively arranged centrally with respect to the stereo channel which contains the corresponding optical wedges, and not with respect to the optical axis of the main objective, wedge angles differing slightly in terms of magnitude are obtained for the compensation for the lateral image offsets described with reference to FIGS. 3 to 5, namely 3.962° instead of 3.926°.

Figure 12:
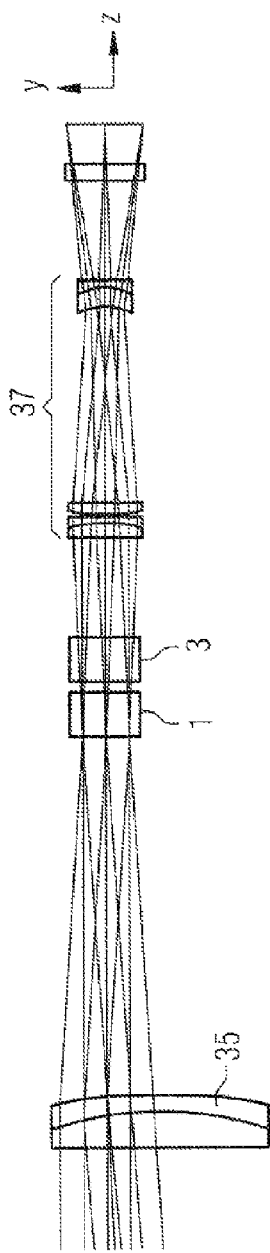
FIGS. 12 to 14 show another specific example of an operation microscope having an optical image offset device, for different wedge angles.
Figure 13:
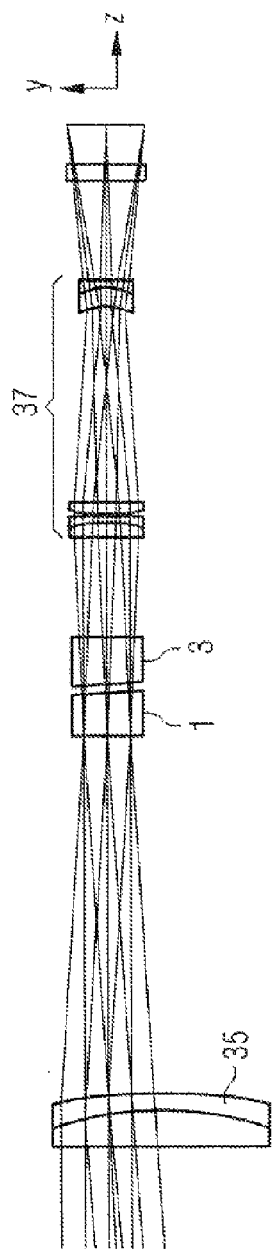
Figure 14:
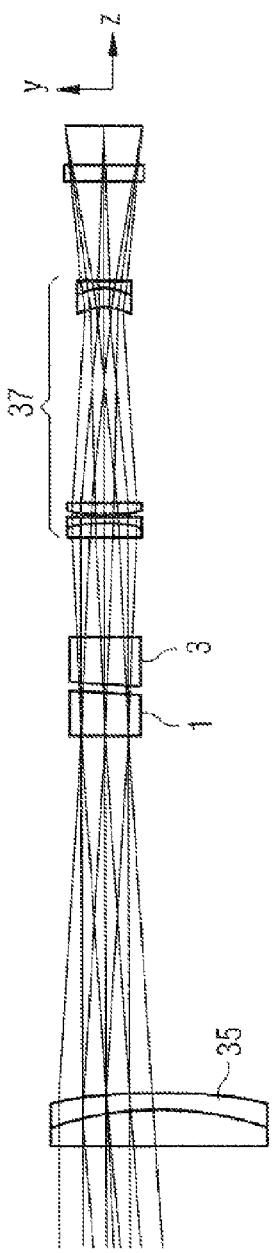
Figure 15:
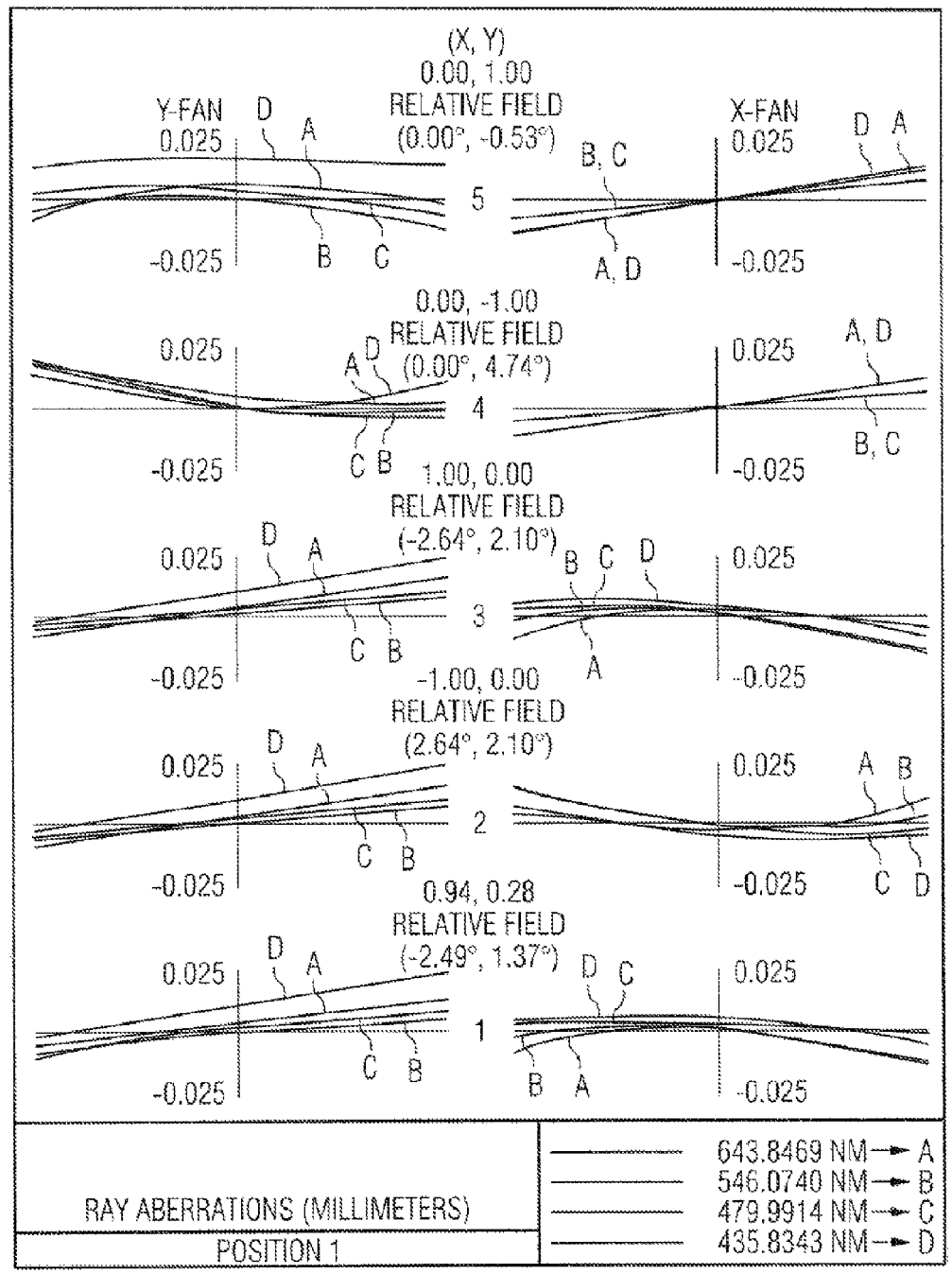
FIGS. 15 to 17 show image error curves for the wedge positions of FIGS. 8 to 10.
Figure 16:
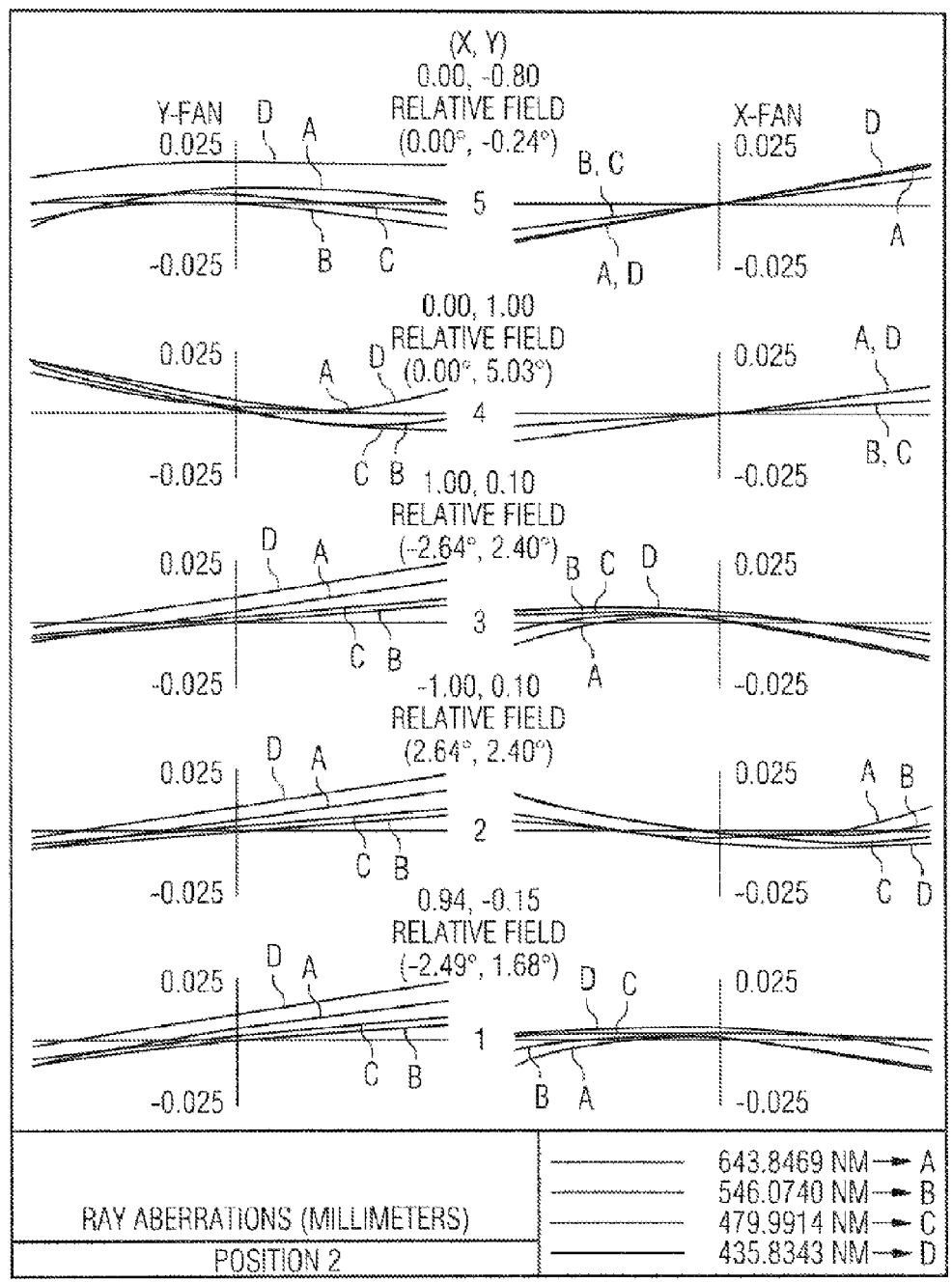
Figure 17:
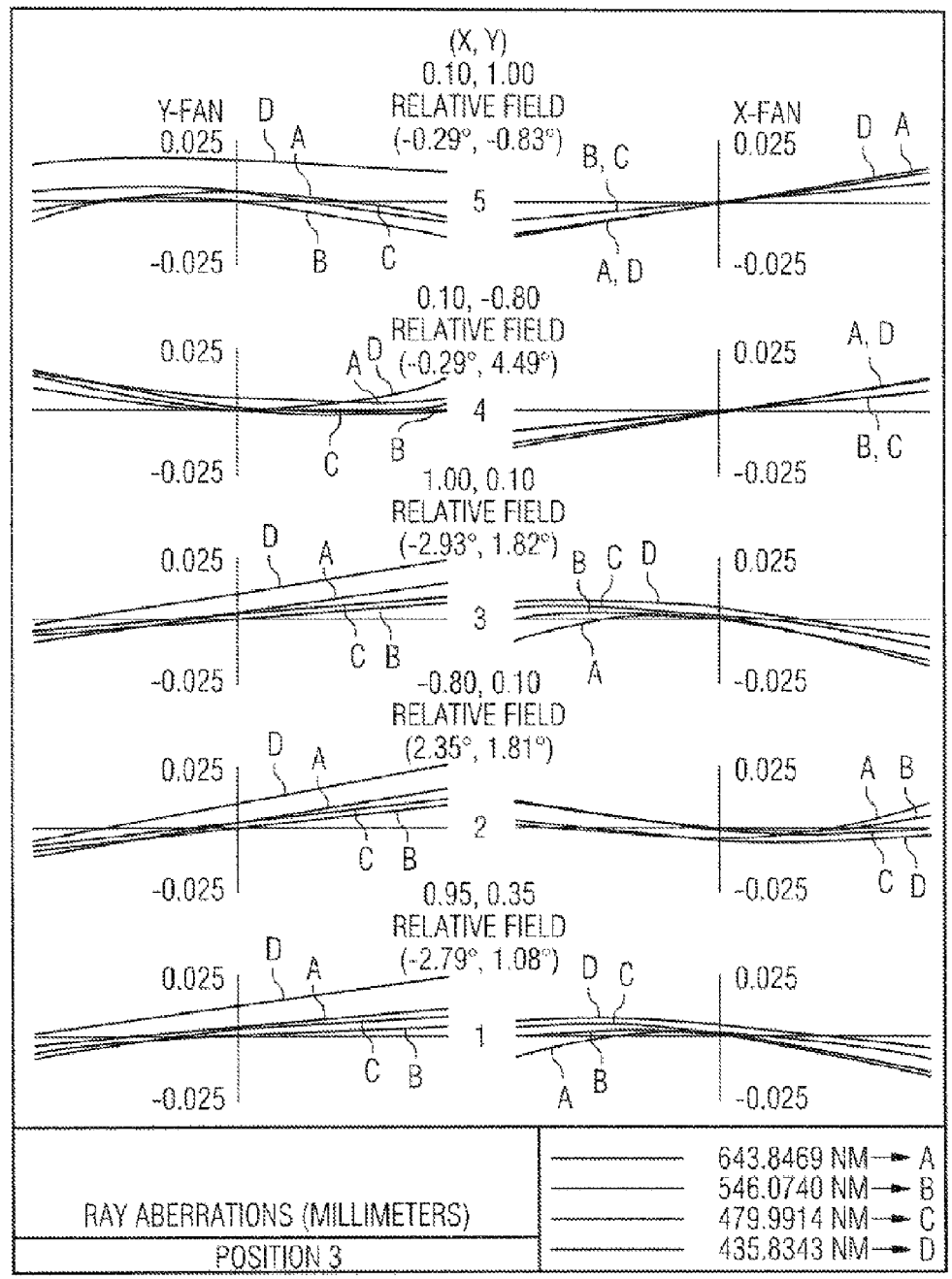

FIGS. 15 to 17 show the image error curves for the compensation positions shown in FIGS. 12 to 14, FIG. 15 showing the image error curves for the position shown in FIG. 12, FIG. 16 showing the image error curves occurring for the position shown in FIG. 13 and FIG. 17 showing the image error curves occurring for the position shown in FIG. 11. From the specific example shown in FIGS. 12 to 17 as well, it can be seen that virtually no image errors are generated by the compensation for the lateral offset.

4th Specific Example

Figure 18:
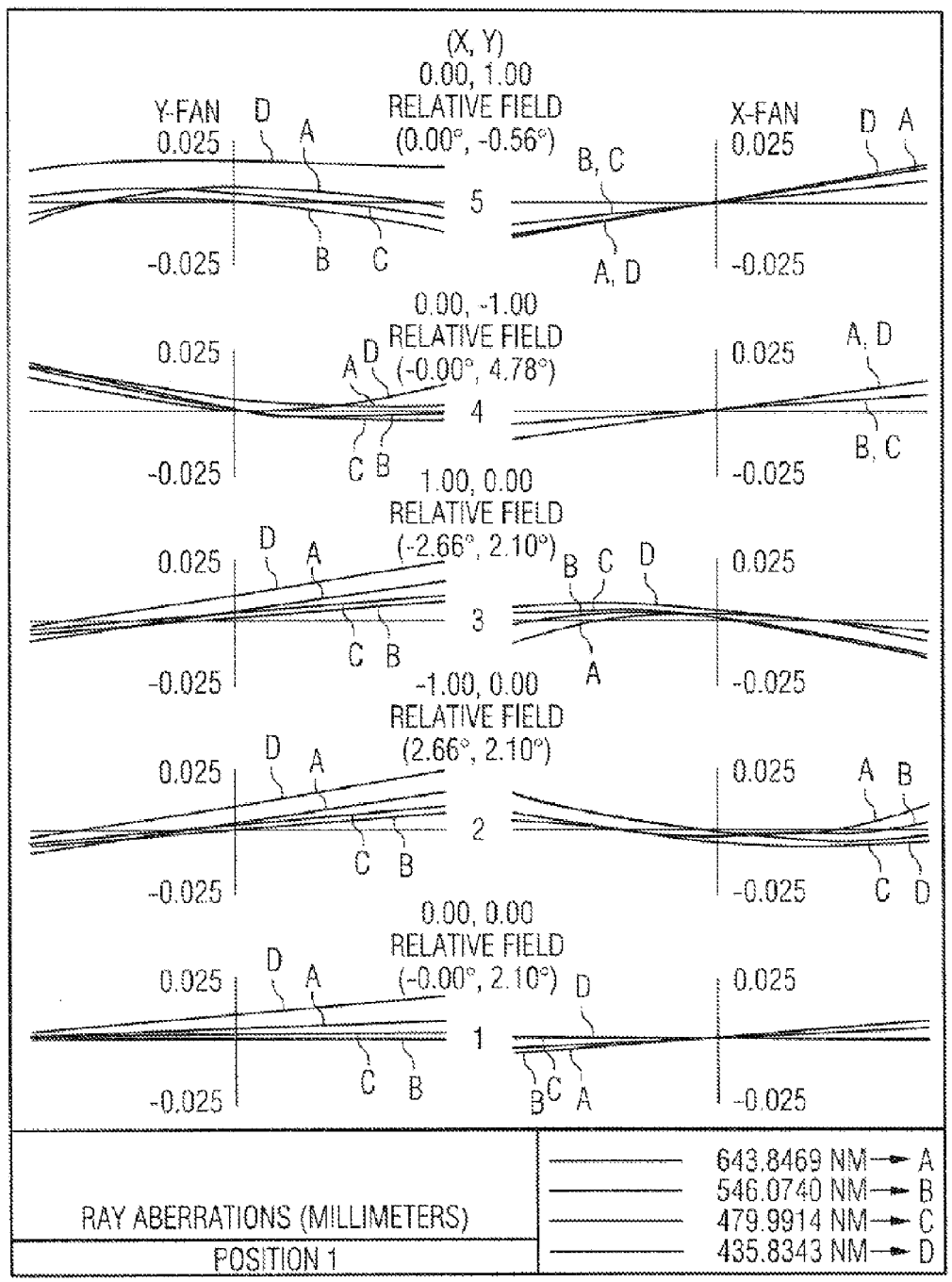
FIGS. 18 to 20 show image error curves for a variant of the exemplary embodiment shown in FIGS. 12 to 14.
Figure 19:
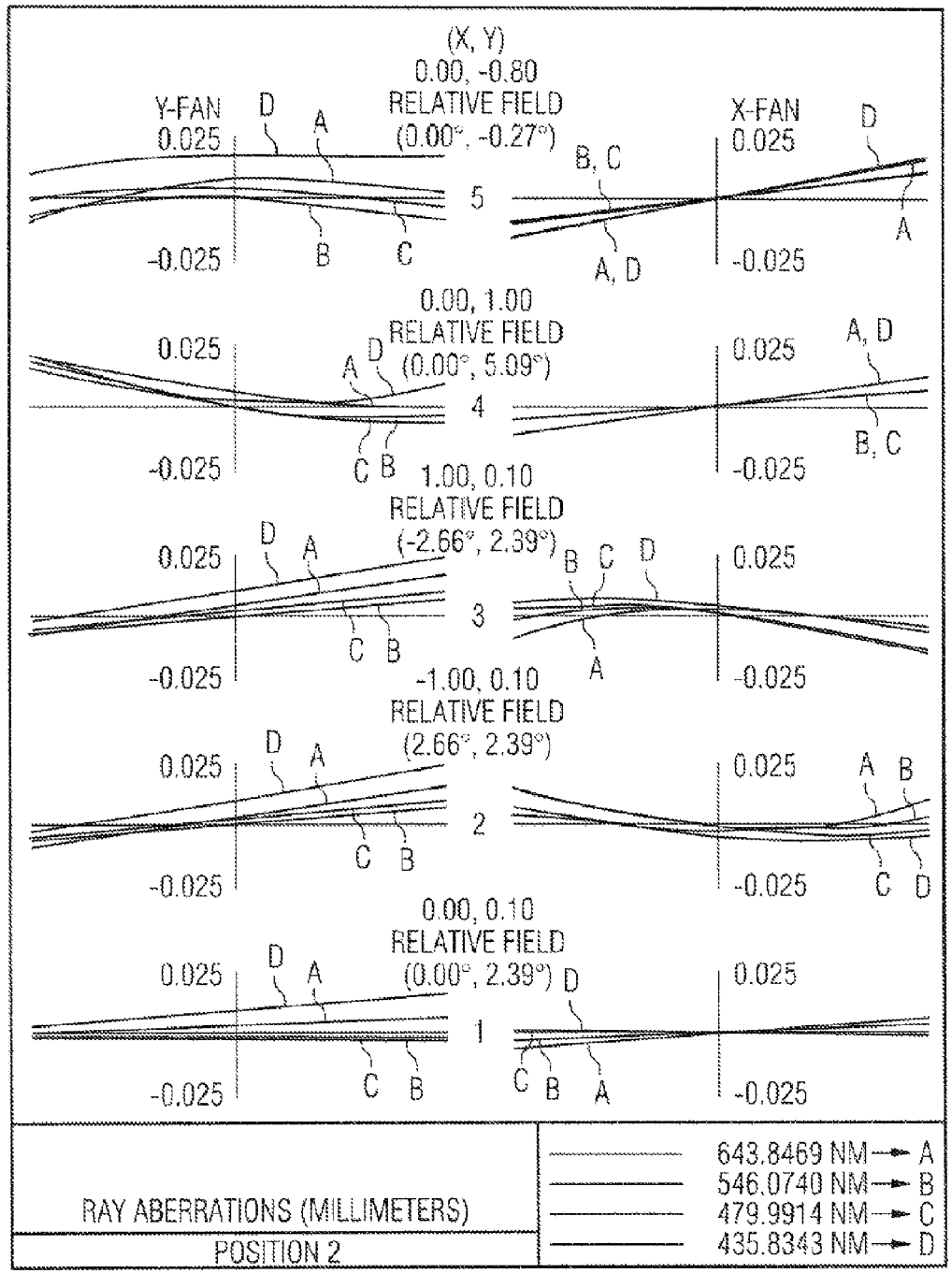
Figure 20:
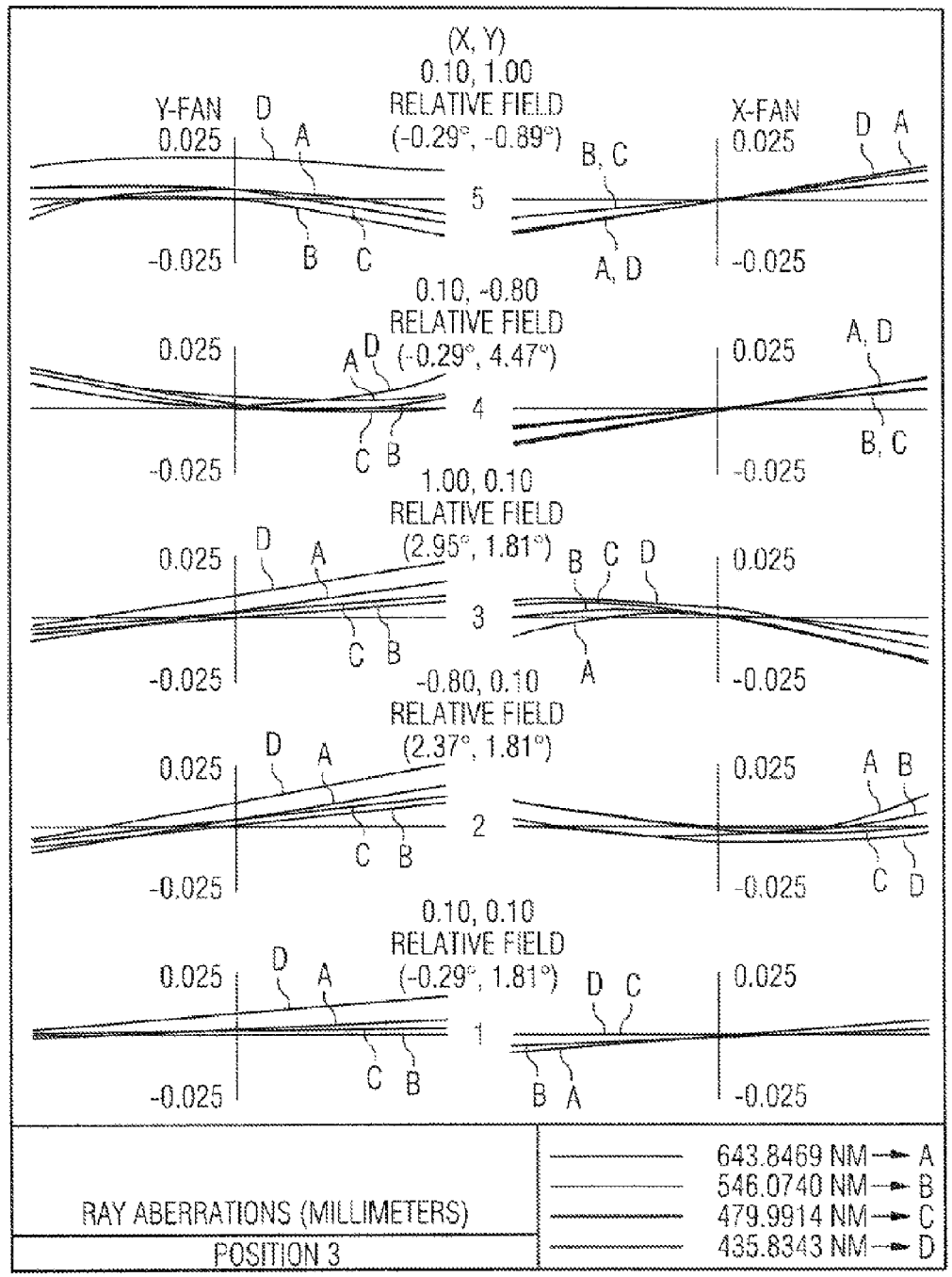

In a variant of the specific example represented in FIGS. 12 to 17, higher-index glasses are used. The glasses used in this case correspond to those indicated in the 2nd specific example. Likewise, the immersion oil used in the 2nd specific example is also used in the 4th specific example described below with reference to FIGS. 18 to 20. FIG. 18 shows the image error curves for a position of the optical wedges as is shown in FIG. 12, FIG. 19 shows the image error curves for a compensation position of the optical wedges as is shown in FIG. 13 and FIG. 20 shows the image error curves for a compensation position of the optical wedges as is shown in FIG. 14. It can be seen that the image errors occurring when using small optical image offset devices in the stereoscopic sub-beam paths are also negligible when using the types of glass and the immersion oil from the 2nd specific example.

The present invention provides an optical image offset device for compensation for a lateral image offset, with which the image offset can be compensated for essentially without generating image errors such as, in particular, chromatic difference of magnification. With this optical image offset device it is possible to provide an advantageous optical image stabilization device which, for example, can compensate for vibrations or hand trembling without generating image errors.

Although the present invention has been described with the aid of exemplary embodiments for illustration purposes, variations from these exemplary embodiments are possible. For instance, the optical image offset device as well as the optical image stabilization device may, besides in operation microscopes, also be used in other microscopes, in binoculars, in photographic cameras, in video cameras, etc. If the optical observation apparatus in which the optical image offset device, or the optical image stabilization device, is intended to be used does not comprise optics having a collimated beam path, the image offset device or the image stabilization device may be arranged before the objective, particularly when objects arranged at a far distance are observed or recorded, as is the case for instance with binoculars and telescopes, but often also in the case of photographic and video cameras. In order to be able to arrange the device before the objective, the optical image offset device, or the optical image stabilization device, may be integrated into an attachment to be fitted to the objective.

It is furthermore possible to combine the image offset device with two freeform elements which can be moved with respect to one another in a direction perpendicular to the optical axis, particularly when the optical image offset device is arranged in or in the vicinity of an aperture stop plane in the collimated beam path. The freeform elements respectively have at least one freeform face. By relative displacement of the two freeform elements, it is possible to adjust the refractive power of the optical element formed from the two freeform elements. Such freeform elements, and the properties thereof, are described for example in U.S. Pat. No. 3,305,294. With respect to the structure and the properties of freeform elements, reference is made to this document. Use of the freeform elements makes it possible to carry out refractive power modifications with very small control movements, which can be executed with small forces—and therefore with small accelerations—and sufficiently rapidly.

Variations are also possible in respect of the acceleration sensors, gyro sensors and tracking systems which have been described. For instance, it is also possible to record the movement of the optical observation apparatus by means of a micro-GPS system. This variant may, in particular, be carried out when the optical observation apparatus is operated in rooms in which such a micro-GPS system is installed.

The present invention is therefore intended to be restricted not to the exemplary embodiments described for illustration purposes, but by the appended claims.

What is claimed is:

1. Optical image offset device for compensating for or producing a lateral offset of an image of an observation object in an optical observation device, the optical image offset device comprising at least two optical wedges of equal size which are arranged successively along an optical axis and which are respectively composed of at least two optical elements, characterized in that each optical wedge has an adjustable wedge angle,
wherein each wedge angle is an angle between two planar surfaces of the optical elements of each optical wedge, adjusted by the rotation of the optical elements about a second and third axis perpendicular to one another, and the optical wedges have different refractive indices and different dispersions;
wherein the two optical elements of the first optical wedge respectively have the same Abbe number $V_1$ and the same refractive index $n_1$,
the two optical elements of the second optical wedge respectively have the same Abbe number $V_2$ and the same refractive index $n_2$, and
the refractive index $n_1$ of the first optical wedge, the refractive index $n_2$ of the second optical wedge, the Abbe number $V_1$ of the first optical wedge, the Abbe number $V_2$ of the second optical wedge, the wedge angle $\alpha_1$ of the first optical wedge and the wedge angle $\alpha_2$ of the second optical wedge satisfy the relationship:

$$\frac{\alpha_1}{\alpha_2} = \frac{V_1}{V_2} \frac{n_2 - 1}{n_1 - 1}.$$

2. Optical image offset device according to claim 1, wherein the at least two optical elements of an optical wedge are respectively a planoconvex lens having a plane lens face and a convex lens face and a planoconcave lens having a plane lens face and a concave lens face, the convex lens face of the planoconvex lens and the concave lens face of the planoconcave lens having the same radii of curvature and lying facing one another.

3. Optical image offset device according to claim 2, wherein there is a film of an immersion medium between the convex lens face of the planoconvex lens and the concave lens face of the planoconcave lens of an optical wedge.

4. Optical image offset device according to claim 3, wherein the immersion medium is a resilient fine optical cement, an immersion oil, an immersion solution or a sol-gel.

5. Optical image offset device according to claim 4, wherein the resilient fine optical cement is based on an epoxy resin or ketone resin.

6. Optical image offset device according to claim 3, wherein the refractive index of the immersion medium in the first optical wedge corresponds to the refractive index $n_1$ and the refractive index of the immersion medium in the second optical wedge corresponds to the refractive index $n_2$.

7. Optical image offset device according to claim 2, wherein the convex lens face of the planoconvex lens and the concave lens face of the planoconcave lens are spherical faces which have a common center.

8. Optical image offset device according to claim 7, wherein the planoconvex lenses of the optical wedges are formed as hemisphere segments.

9. Optical image offset device according to claim 8, wherein the planoconvex lenses, formed as hemisphere segments, of the of the two optical wedges are cemented together on their plane faces.

10. Optical image offset device according to claim 1, wherein the at least two optical wedges consist of glass or plastic and the two optical elements of an optical wedge respectively consist of the same glass or plastic.

11. Optical image offset device according to claim 1, wherein two optical wedges are provided, the adjustable wedge angles of which are equal in magnitude and different in sign for each wedge angle to be adjusted.

12. Optical image stabilization device having an optical image offset device according to claim 1 actuators for adjusting the wedge angles of the optical wedges in the optical image offset device on the basis of a control signal representing the wedge angles to be adjusted; an offset determination instrument for determination of the offset of an image of the observation object with respect to the optical axis of the optical observation apparatus and for output of an offset signal representing the offset which has been determined; and a control instrument, which is connected to the offset determination instrument for reception of the offset signal and to the actuators for output of the control signal, and which determines the control signal on the basis of the received offset signal.

13. Optical image stabilization device according to claim 12, wherein the offset determination instrument comprises a movement sensor for detecting a movement of the optical observation apparatus.

14. Optical image stabilization device according to claim 12, wherein the offset determination instrument comprises a device for sighting or tracking a reference point in the image generated by the optical observation apparatus.

15. Optical observation apparatus having an optical axis, characterized by an optical image offset device according to claim 1, the wedges of the optical image offset device being arranged along the optical axis of the optical observation apparatus.

16. Optical observation apparatus according to claim 15, wherein it has observation optics having an objective, and the optical image offset device is arranged on the object side before the objective.

17. Optical observation apparatus according to claim 15, wherein it has observation optics which comprise a collimated beam path, and the optical image offset device is arranged in the collimated beam path.

18. Optical observation apparatus according to claim 17, wherein it has observation optics having at least one aperture stop plane, and the optical image offset device is arranged in the aperture stop plane or immediately next thereto.

19. Optical observation apparatus according to claim 15, wherein it comprises observation optics having at least two optical image sub-channels.

20. Optical observation apparatus according to claim 19, wherein an optical image offset device is provided in each image sub-channel.

\* \* \* \* \*